United States Patent
Hanna et al.

(10) Patent No.: US 12,312,081 B2
(45) Date of Patent: *May 27, 2025

(54) PILOTLESS TRANSPORTATION AERIAL-VEHICLE HAVING DISTRIBUTED-BATTERIES AND POWERING METHOD THEREFOR

(71) Applicants: Mark Holbrook Hanna, Ogden, UT (US); Douglas Morgan Hanna, Calgary (CA)

(72) Inventors: Mark Holbrook Hanna, Ogden, UT (US); Douglas Morgan Hanna, Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,676

(22) Filed: Oct. 2, 2023

(65) Prior Publication Data

US 2024/0294253 A1    Sep. 5, 2024

Related U.S. Application Data

(63) Continuation of application No. 17/275,591, filed as application No. PCT/CA2019/051270 on Sep. 10, 2019, now Pat. No. 11,772,794.

(Continued)

(51) Int. Cl.
*B60L 50/60*    (2019.01)
*B64C 39/02*    (2023.01)
(Continued)

(52) U.S. Cl.
CPC ............ *B64C 39/024* (2013.01); *B60L 50/66* (2019.02); *B64D 27/24* (2013.01); *B64U 10/13* (2023.01);

(Continued)

(58) Field of Classification Search
CPC .......... B60L 50/66; B64D 27/24; B64U 50/19
(Continued)

(56) References Cited

U.S. PATENT DOCUMENTS

| 3,937,424 A | 2/1976 | Meier et al. |
| 10,065,726 B1 | 9/2018 | Phan et al. |

(Continued)

FOREIGN PATENT DOCUMENTS

| CN | 204810432 U | 11/2015 |
| CN | 105539811 A | 5/2016 |

(Continued)

OTHER PUBLICATIONS

International Search Report and Written Opinion of the International Searching Authority directed to related International Patent Application No. PCT/CA2019/051270, mailed Nov. 21, 2019; 11 pages.

(Continued)

*Primary Examiner* — Christopher P Ellis
(74) *Attorney, Agent, or Firm* — Sterne, Kessler, Goldstein & Fox P.L.L.C.

(57) ABSTRACT

An electric aerial vehicle includes a center unit, a plurality of rotor units coupled to the center unit via one or more connecting arms, one or more battery assemblies, and a plurality of electrical circuitry components. The center unit includes a compartment. Each of the rotor units includes at least a propeller, a motor for driving the propeller, and an electrical speed-controller (ESC) module electrically coupled to the motor. The one or more battery assemblies provide electrical power to at least corresponding ones of the motors and corresponding ones of the ESC modules. The electrical circuitry components include a central control circuitry and at least one subsystem. Each of the battery assemblies extends horizontally along the one or more (Continued)

connecting arms towards a proximal end of a corresponding one of the one or more rotor units, wherein the proximal end is coupled to the center unit.

20 Claims, 24 Drawing Sheets

Related U.S. Application Data

(60) Provisional application No. 62/729,839, filed on Sep. 11, 2018.

(51) Int. Cl.
| | | |
|---|---|---|
| *B64D 27/24* | (2024.01) | |
| *B64U 10/13* | (2023.01) | |
| *B64U 10/25* | (2023.01) | |
| *B64U 30/20* | (2023.01) | |
| *B64U 50/19* | (2023.01) | |
| *B64U 50/32* | (2023.01) | |
| *G05D 1/00* | (2006.01) | |
| *B64U 60/50* | (2023.01) | |
| *B64U 101/60* | (2023.01) | |

(52) U.S. Cl.
CPC ............ *B64U 10/25* (2023.01); *B64U 50/19* (2023.01); *B64U 50/32* (2023.01); *G05D 1/101* (2013.01); *B60L 2200/10* (2013.01); *B64U 30/20* (2023.01); *B64U 60/50* (2023.01); *B64U 2101/60* (2023.01); *B64U 2201/10* (2023.01); *B64U 2201/20* (2023.01)

(58) Field of Classification Search
USPC .......................................................... 244/55
See application file for complete search history.

(56) References Cited

U.S. PATENT DOCUMENTS

| | | |
|---|---|---|
| 10,559,792 B1 | 2/2020 | Combs |
| 10,919,635 B2 | 2/2021 | Edgar et al. |
| 11,434,014 B2 | 9/2022 | Halverson |
| 11,549,994 B1 | 1/2023 | Lohe et al. |
| 11,634,230 B2 | 4/2023 | Kawai |
| 2016/0107756 A1 | 4/2016 | Liske et al. |
| 2016/0122018 A1 | 5/2016 | Matsue et al. |
| 2017/0126935 A1 | 5/2017 | Tai et al. |
| 2017/0247120 A1 | 8/2017 | Miller |
| 2017/0334581 A1 | 11/2017 | White et al. |
| 2018/0099756 A1 | 4/2018 | Gore |
| 2018/0105063 A1 | 4/2018 | Wei et al. |
| 2018/0108891 A1 | 4/2018 | Fees et al. |
| 2019/0339334 A1 | 11/2019 | Mikolajczak |
| 2020/0223545 A1 | 7/2020 | Brooks et al. |
| 2020/0277062 A1 | 9/2020 | Becker et al. |
| 2020/0277080 A1 | 9/2020 | Wiegman |
| 2021/0261253 A1 | 8/2021 | Hanna et al. |

FOREIGN PATENT DOCUMENTS

| | | | |
|---|---|---|---|
| CN | 105914731 A | 8/2016 | |
| CN | 205469859 U | 8/2016 | |
| CN | 106143912 A | 11/2016 | |
| CN | 106314793 A | 1/2017 | |
| CN | 107108009 A | 8/2017 | |
| CN | 107660190 A | 2/2018 | |
| CN | 207045705 U | 2/2018 | |
| CN | 207225643 U | 4/2018 | |
| CN | 109131863 B | 1/2019 | |
| EP | 2738093 A1 | 6/2014 | |
| WO | WO 2014/075609 A1 | 5/2014 | |
| WO | WO 2016/189797 A1 | 12/2016 | |
| WO | WO 2017/131451 A1 | 8/2017 | |
| WO | WO 2017/200609 A1 | 11/2017 | |
| WO | WO 2018/008987 A1 | 1/2018 | |
| WO | WO 2018/040116 A1 | 3/2018 | |
| WO | WO 2018/094514 A1 | 5/2018 | |
| WO | WO 2019/143255 A1 | 7/2019 | |
| WO | WO 2020/003181 A1 | 1/2020 | |
| WO | WO 2020/077121 A1 | 4/2020 | |

OTHER PUBLICATIONS

International Preliminary Report on Patentability directed to related International Patent Application No. PCT/CA2019/051270, issued Mar. 9, 2021; 7 pages.

Extended European Search Report directed to related European Application No. 19858998.8, issued May 9, 2022; 9 pages.

PILOTLESS TRANSPORTATION AERIAL-VEHICLE HAVING DISTRIBUTED-BATTERIES AND POWERING METHOD THEREFOR

CROSS-REFERENCE TO RELATED APPLICATIONS

This application is a continuation of U.S. patent application Ser. No. 17/275,591 filed Mar. 11, 2021, which is a National Stage Entry of PCT International Application No. PCT/CA2019/051270 filed Sep. 10, 2019, which claims the benefit of U.S. Provisional Patent Application Ser. No. 62/729,839 filed Sep. 11, 2018, the content of which is incorporated herein by reference in its entirety.

FIELD OF THE DISCLOSURE

The present disclosure relates generally to pilotless personal-transportation or cargo-transportation aerial-vehicles, and in particular to pilotless aerial-vehicles powered by distributed batteries for personal or cargo transportation, and a powering method for same.

BACKGROUND

Unmanned aerial vehicles (UAVs) or drones are known. A UAV generally comprises a flight structure received therein or thereon an energy source for driving an engine to flight, a central controller for controlling the engine, and other components as required. A UAV may be operated by a remote operator via a remote control in communication with the central controller, and/or operated automatically or autonomously by a pilot program on the UAV or remote thereto. Therefore, a fundamental difference between UAVs and traditional aircrafts is that UAVs do not have any human pilots onboard.

UAVs may be powered by various energy sources such as batteries, solar panels, and/or fuels (for example, gas, diesel, and the like). In prior-art battery-powered UAVs, the batteries thereof are usually rechargeable Lithium-ion polymer batteries (also called "Lithium polymer (Li—Po) batteries"). While Li—Po batteries are of light weight, they generally occupy a substantive space in the UAV, provide limited flight time, and require long recharging time.

In prior-art battery-powered UAVs, the batteries thereof are usually arranged near the central controller, and may cause interferences to components thereof. Such interference may occur during preflight calibrations and/or flight thereby preventing proper operation of the UAV or causing a critical UAV failure such as a crash during flight.

For example, it has been observed that batteries at high discharge rates may cause magnetic interference to magnetometer which is a component often in or used by the central controller. As another example, while metal-clad batteries have the advantages of high energy-density and thus high energy-storage capacity, they may cause significant magnetic interference to the nearby central controller and therefore, have not gained use in prior-art UAVs.

SUMMARY

According to one aspect of this disclosure, there is disclosed a battery-powered, multiple-rotor, pilotless Autonomous Aerial Vehicle (AAV) which may be a personal-transportation drone (PTD), a passenger-transportation drone, a cargo-transportation aerial-vehicle, or the like. The battery-powered aerial vehicle does not require a pilot onboard and may be operated autonomously or may be remotely controlled.

In some embodiments, the battery-powered aerial vehicle may be an autonomous aerial vehicle for transporting human passengers. In some other embodiments, the battery-powered aerial vehicle may be an autonomous cargo aerial vehicle for transporting a variety of objects. In some embodiments, the battery-powered aerial vehicle may be a remotely-controlled aerial vehicle for transportation.

According to one aspect of this disclosure, the battery-powered aerial vehicle comprises a center unit, a plurality of rotor units circumferentially uniformly distributed about and coupled to the center unit, and one or more battery assemblies. The center unit comprises a central control circuitry. Each rotor unit comprises a propeller, a motor coupled to and driving the propeller, and an electrical speed-controller (ESC) module electrically coupled to the motor for controlling the speed of the motor. The one or more battery assemblies are configured for powering at least the motors and the ESC module, and may also be configured for powering the central control circuitry. Each of the one or more battery assemblies is located in a rotor unit in proximity with or adjacent to the motor thereof.

Therefore, the one or more battery assemblies are at a distance away from the central control circuitry. Interferences that the one or more battery assemblies may otherwise cause to the central control circuitry are significantly reduced.

According to one aspect of this disclosure, there is disclosed a battery-powered aerial vehicle comprising a body; a central control circuitry received in the body; at least one propelling module received in the body and functionally coupled to the central control circuitry, each of the at least one propelling module comprising a base structure; and one or more battery assemblies coupled to or received in the body.

The one or more battery assemblies are configured for at least powering the at least one propelling module, and the one or more battery assemblies are at a distance away from the central control circuitry for reducing electromagnetic interference to the central control circuitry.

According to one aspect of this disclosure, there is disclosed a battery-powered aerial vehicle comprising: a center unit comprising a central control circuitry; a plurality of rotor units circumferentially uniformly distributed about and coupled to the center unit; and one or more battery assemblies for powering at least the motors and the electrical speed-controllers. Each rotor unit comprises a propeller, an electrical motor coupled to and driving the propeller, and an electrical speed-controller electrically coupled to the motor for controlling the speed thereof. Each of the one or more battery assemblies is located in a rotor unit in proximity with or adjacent to the motor thereof.

In some embodiments, the aerial vehicle comprises a propelling module for flight, a central control circuitry for controlling the propelling module, and one or more battery assemblies such as metal-clad high-energy-density battery assemblies and/or Li—Po batteries for powering the propelling module and the central control circuitry, although in some embodiments the central control circuitry may have its own power source. Each battery assembly may comprise one or more battery cells. The aerial vehicle may be operated by a remote operator via a remote control in communication with the central control circuitry, and/or operated automatically or autonomously by a pilot program on the aerial vehicle or remote thereto.

In various embodiments, the one or more battery assemblies are at a distance away from the central control circuitry for reducing or eliminating electromagnetic interference to the central control circuitry and the components thereof such as magnetometer.

In some embodiments, the aerial vehicle is a battery-powered UAV having a distributed battery pack and at least one ESC module. The distributed battery pack comprises one or more battery assemblies located away from the UAV center controller with distances sufficient for reducing or eliminating electromagnetic interference to components thereof.

In some embodiments, the UAV is a battery-powered, multiple-axial or multiple-rotor UAV such as quadcopter (i.e., drones having four rotor units), hexacopter (i.e., drones having six rotor units), octocopter (i.e., drones having eight rotor units), and the like, wherein in each rotor unit, the UAV comprise an electrical motor with a rotor blade or propeller rotatably coupled thereto. A metal-clad high-energy-density battery assembly of the distributed battery pack is arranged adjacent (e.g., underneath) each rotor unit, and mechanically and electrically coupled thereto for powering the electrical motor.

In some embodiments, each battery assembly of the distributed battery pack is located in proximity with or adjacent to a motor and has a capacity sufficient for providing the required power to that motor.

In some embodiments wherein the UAV comprises a plurality of connecting arms, each connecting arm supports a motor at a distal end thereof, wherein each battery assembly is located about the distal end of a respective connecting arm, such as coupled to the motor or coupled to the connecting arm about the distal end thereof, for powering the motor.

In some embodiments, each battery assembly may also act as a supporting leg, or be a part of a supporting leg, or be attached to a supporting leg.

In some embodiments wherein each motor is mounted on a base structure, each battery assembly is also coupled to a respective base structure. Of course, those skilled in the art will appreciate that in some embodiments, the locations of the battery assemblies may be a combination of the locations described herein. For example, some battery assemblies may be located underneath respective motors as supporting legs, and some other battery assemblies may be located in connecting arms.

In some embodiments, each ESC module is located near a respective motor and is electrically coupled to a respective battery assembly and the respective motor for powering the motor and controlling the speed thereof thereby resulting in much shorter electrical wiring between motor and the ESC module as well as shorter electrical wiring between the battery and the ESC module compared to that in conventional UAVs in which the ESC modules are located distant from the battery or distant from the motor. These short electrical wirings between the battery assembly and the ESC modules reduce the electrical noise and variation otherwise caused by the wirings during dynamic motor speed variations, thereby reducing the probability of ESC-module failure. These short electrical wirings between the battery and the ESC module as well as the ESC module and the motor result in lower UAV weight.

Those skilled in the art will appreciate that battery drain may not be even across all battery assemblies (i.e., battery assemblies may not be evenly drained) due to uneven loads placed on motors. In some embodiments, battery-power balancing is used for balancing the power consumption of each battery assembly, and for maximizing the life of the battery assemblies. In some embodiments, passive balancing may be used. In some other embodiments, active balancing may be used. In yet some other embodiments, a battery management system (BMS) may be used. Depending on the implementation, the BMS may comprise active balancing, temperature monitoring, charging, and other suitable battery management functions.

According to one aspect of this disclosure, there is disclosed a battery-powered aerial vehicle comprising: a center unit comprising a compartment for receiving therein one or more passengers and/or cargo goods; one or more rotor units coupled to the center unit; one or more battery assemblies; and a plurality of electrical circuitry components comprising a central control circuitry and at least a flight control subsystem, a detecting and avoiding subsystem, and an emergency communication subsystem controlled by the central control circuitry, one or more of the plurality of the electrical circuitry components received in the center unit. The one or more rotor units comprise one or more propelling modules functionally coupled to the central control circuitry; the one or more battery assemblies are configured for being controlled by the flight control subsystem for at least powering the one or more propelling modules; and the one or more battery assemblies are at a distance away from the center unit for reducing electromagnetic interference to the one or more of the electrical circuitry components in the center unit.

In some embodiments, one or more of the plurality of the electrical circuitry components are received in an upper portion of the compartment; and at least one of the one or more battery assemblies is received in a lower portion of the compartment.

In some embodiments, at least one of the one or more battery assemblies is received in a lower portion of the compartment under a floor thereof.

In some embodiments, the one or more rotor units coupled to a lower portion of the center unit.

In some embodiments, the one or more rotor units coupled to an upper portion of the center unit.

In some embodiments, the battery-powered aerial vehicle further comprises one or more supporting legs; and at least one of the one or more supporting legs comprises at least one of the one or more battery assemblies.

In some embodiments, at least one of the one or more battery assemblies is located in a rotor unit and is configured for acting as a supporting leg.

In some embodiments, the battery-powered aerial vehicle further comprises a plurality of supporting legs; and at least one of the one or more battery assemblies extends between two of the plurality of supporting legs.

In some embodiments, at least one of the plurality of supporting legs extends downwardly from one of the one or more rotor units.

In some embodiments, the battery-powered aerial vehicle comprises a plurality of rotor units; and at least one of the one or more battery assemblies extends between two of the plurality of rotor units.

In some embodiments, at least one of the one or more battery assemblies extends downwardly from at least one of the one or more propelling modules.

In some embodiments, the one or more rotor units are coupled to the center unit via one or more coupling components.

In some embodiments, each of the one or more coupling components is a connecting arm.

In some embodiments, the battery assembly extends downwardly from the coupling component.

In some embodiments, the battery-powered aerial vehicle further comprises a cage; at least one of the one or more battery assemblies forms a part of the cage.

In some embodiments, the battery-powered aerial vehicle further comprises a cage; and at least one of the one or more battery assemblies is received in the cage.

In some embodiments, the cage is located under the compartment.

In some embodiments, the plurality of electrical circuitry components further comprises a backup central control circuitry.

In some embodiments, the plurality of electrical circuitry components further comprises at least a magnetometer in the center unit.

In some embodiments, at least one of the one or more battery assemblies comprises one or more metal-clad battery cells.

In some embodiments, each of the one or more battery assemblies is in proximity with or adjacent to one of the one or more propelling modules; and the central control circuitry is at the distance away from the one or more propelling modules.

In some embodiments, the central control circuitry comprises a battery-power balancing circuit for balancing the power consumption rates of the one or more battery assemblies.

In some embodiments, each of the one or more propelling modules comprises an electrical motor coupled to a base structure, a propeller rotatably coupled to the electrical motor, and an electrical speed-controller coupled to the base structure and electrically coupled to the electrical motor for controlling the speed thereof.

In some embodiments, the propeller of at least one of the one or more propelling modules is located above the electrical motor.

In some embodiments, the propeller of at least one of the one or more propelling modules is located under the electrical motor.

In some embodiments, the plurality of electrical circuitry components further comprise a flight management subsystem.

In some embodiments, the flight control subsystem and flight management subsystem are configured for automatically controlling managing the flight of the battery-powered aerial vehicle.

In some embodiments, the plurality of electrical circuitry components further comprise a communication subsystem (e.g., for audio/video communication and/or data communication) and a power management subsystem.

In some embodiments, the plurality of electrical circuitry components further comprise a climate control subsystem, a furniture control subsystem, an entertainment subsystem, and a booking and payment subsystem.

In some embodiments, the plurality of electrical circuitry components further comprise one or more backup subsystems of at least the flight control subsystem, the detecting and avoiding subsystem, and the emergency communication subsystem.

BRIEF DESCRIPTION OF THE DRAWINGS

FIGS. 13A to 13H show the base structure of the rotor unit shown in FIG. 11, wherein FIG. 13A is a perspective view of the base structure, viewing from a first viewing angle, FIG. 13B is a perspective view of the base structure, viewing from a second viewing angle, FIGS. 13C to 13G are front, rear, plan, bottom, and side views of the base structure, respectively, and FIG. 13H is a schematic cross-sectional view of the base structure;

FIGS. 14A to 14E show the housing of the battery assembly of the rotor unit shown in FIG. 11, wherein FIG. 14A is a perspective view of the battery housing, viewing from a first viewing angle, FIG. 14B is a perspective view of the battery housing, viewing from a second viewing angle, FIGS. 14C and 14D are side and front views of the battery housing, respectively, and FIG. 14E is a schematic cross-sectional view of the battery housing;

DETAILED DESCRIPTION

Figure 1A:
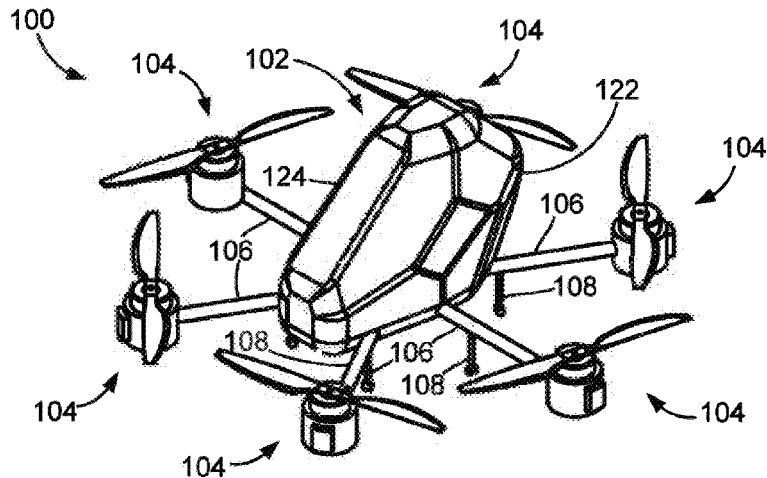
FIG. 1A is a perspective view of a battery-powered, multiple-rotor, pilotless, personal-transportation aerial vehicle having a center unit and a plurality of rotor units, according to some embodiments of this disclosure.
Figure 1B:
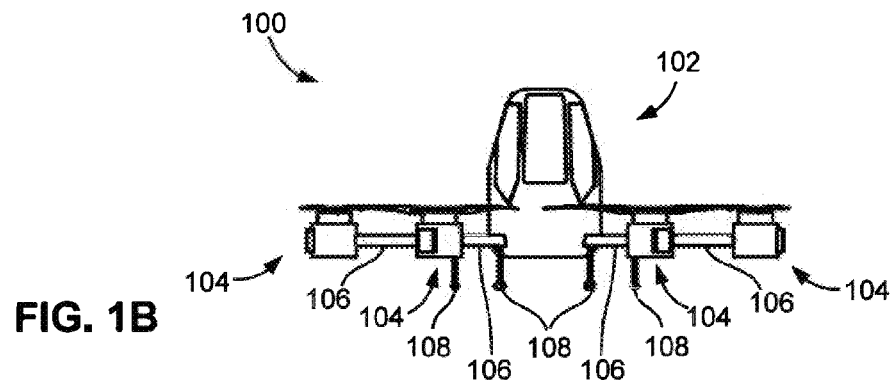
FIGS. 1B and 1C are front and plan views of the aerial vehicle shown in FIG. 1A, respectively.
Figure 1C:
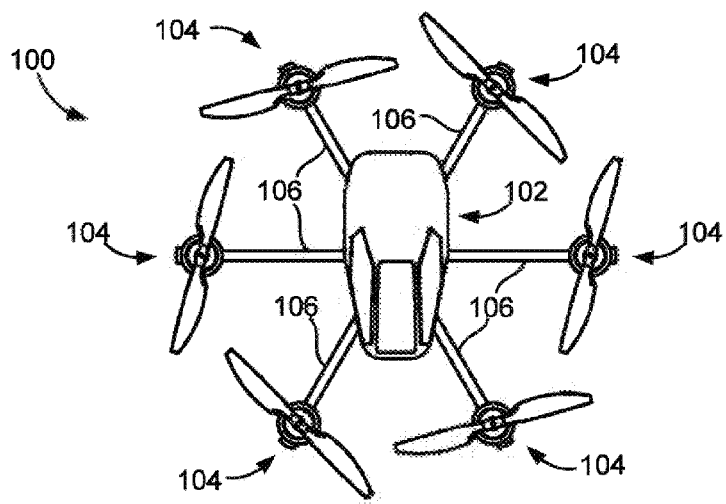

Turning to FIGS. 1A to 1C, a battery-powered (personal or cargo) transportation aerial vehicle is shown and is generally identified using reference numeral 100. In these embodiments, the battery-powered aerial vehicle 100 is a battery-powered multiple-rotor personal-transportation drone (PTD) or aerial vehicle, a passenger-transportation drone or aerial vehicle, a cargo-transportation drone or aerial vehicle, or an Autonomous Aerial Vehicle (AAV).

The aerial vehicle 100 may be used for transporting passengers and/or goods in a local area such as a downtown core that is usually busy and lacks parking spaces for ground vehicles, from rooftop to rooftop or from rooftop to street level. The aerial vehicle 100 may be used for transporting passengers and/or goods from downtown to suburbs and back, from urban to rural and back, or between cities. In some embodiments, the battery-powered aerial vehicle 100 does not require a pilot onboard and may be operated autonomously or may be remotely controlled.

As shown in FIGS. 1A to 1C, the aerial vehicle 100 comprises a center unit 102 and a plurality of generally identical rotor units 104 generally uniformly distributed about the center unit 102 and coupled thereto via a plurality of coupling components 106 such as connecting arms.

The aerial vehicle 100 comprises a plurality of supporting legs 108 extending downwardly from the coupling components 106 and/or the center unit 102 for supporting the aerial vehicle 100 when the aerial vehicle 100 is landed on a surface. In these embodiments, each supporting leg 108 comprises a wheel at a distal end thereof for landing on the surface and moving thereon. Those skilled in the art will appreciate that in other embodiments, the supporting legs 108 may comprise other suitable landing components such as ski, landing gear, stands, floats, and/or the like for landing on various types of surfaces such as solid ground, snowy ground, water, and/or the like.

Herein, the term "proximal" refers to a side or end towards the center unit 102, and the term "distal" refers to a side or end opposite to the proximal side or end and away from the center unit 102.

Figure 2:
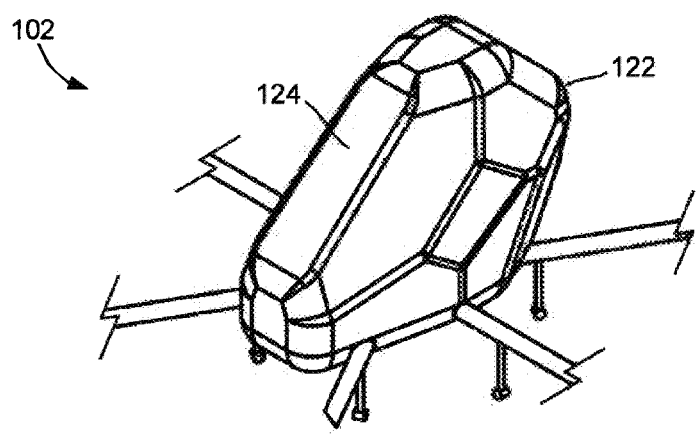
FIG. 2 is a perspective view of a passenger compartment of the aerial vehicle shown in FIG. 1A.

As shown in FIG. 2, the center unit 102 comprises a passenger compartment 122 (also called a cabin or cockpit) with sufficient strength for accommodating and protecting one or more passengers therein. In these embodiments, the center unit 102 comprises a canopy 124 substantively made of a transparent material such as glass for providing generally unobstructed view to the passengers therein. The canopy 124 is pivotable about an end thereof to act as a door or gate for allowing passengers to access (ingress or egress) the compartment 122. Those skilled in the art will appreciate that, depending on the size of the compartment 122 and the number of passengers, the compartment 122 in other embodiments may comprise one or more doors for accessing the compartment 122 and/or one or more windows for providing generally unobstructed view to the passengers therein.

Although not shown in FIG. 2, the compartment 122 in various embodiments may comprise therein a variety of equipment. For example, the compartment 122 may comprise one or more sensors such as magnetometer, and entertainment and comfort equipment such as seats, tables, cameras, and/or the like for passengers to use. Necessary safety restraints such as seat belts and/or airbags are also used.

While the aerial vehicle 100 does not require any pilot, the compartment 122 in some embodiments may still comprise a console such as an instrument panel, having one or more display devices and communication devices for passenger to view and to communicate with remote people such as air traffic control staff. In some embodiments, the compartment 122 comprises at least an emergency communication device for seeking help in emergent situations. The compartment 122 also comprises a central control circuitry for controlling various functional devices or subsystems of the aerial vehicle 100 (described in more detail later).

In some embodiments, the console may further comprise an input device such as a touch-sensitive display for passengers or users to input commands such as departing, landing, changing flight plan, and the like. The input device may also be used by the users for controlling entertainment equipment in and/or about the compartment 122.

Figure 3:
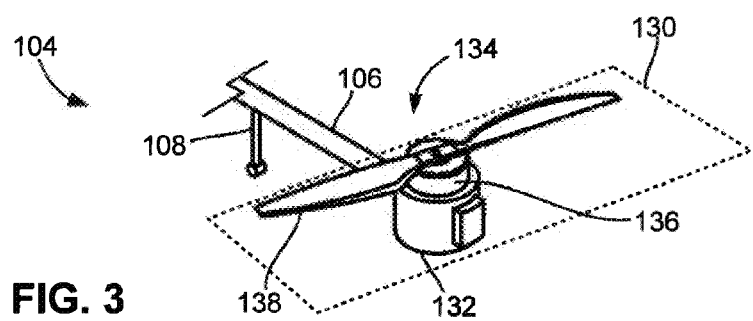
FIG. 3 is a perspective view of a rotor unit of the aerial vehicle shown in FIG. 1A.

FIG. 3 shows one of the rotor units 104. As shown, the rotor unit 104 comprises an electrically-powered propelling module 130 coupled to the center unit 102 via a connecting arm 106 having a cylindrical shape or a cubical shape, or other suitable shapes. A supporting leg 108 is located at a distance away from the center unit 102 and extends downwardly from the connecting arm 106 for supporting the aerial vehicle 100 when the aerial vehicle 100 is landed on a surface.

The propelling module 130 comprises a propelling-module housing structure 132 receiving and mounting therein a powertrain having a rotor assembly 134, an electrical speed-controller (ESC) module (not shown), and other necessary components such as a transmission and/or one or more sensors (described later). The propelling-module housing structure 132 also acts as a mounting base for coupling to the connecting arm 106 for mounting the propelling module 130 to the center unit 102.

The rotor assembly 134 comprises an electrical motor 136 driving a propeller or blade 138 thereabove. Such a propeller configuration is generally denoted as a puller configuration as the propeller in operation "pulls" the rotor unit 104 and therefore the aerial vehicle 100 off the landing surface. The ESC module is electrically coupled to the electrical motor 136 for controlling the speed thereof.

Figure 4:
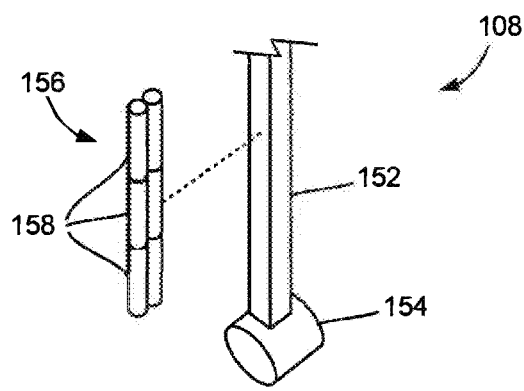
FIG. 4 is a perspective view of a supporting leg of the aerial vehicle shown in FIG. 1A.

As shown in FIG. 4, the supporting leg 108 comprises a leg housing 152 with a wheel 154 coupled to the distal end thereof for supporting and moving the aerial vehicle 100 on a solid surface. The leg housing 152 is a hollow cube or cylinder and receives therein a battery assembly 156 electrically coupled to the center unit 102 and one or more rotor units 104 for providing electrical power thereto.

The battery assembly 156 comprises one or more high-energy-density battery cells 158 which may be any suitable battery cells such as metal-clad batteries, Lithium-ion batteries, Lithium-ion polymer (Li—Po) batteries, and the like. For example, in these embodiments, metal-clad batteries that use clad metals as connectors are used for their high-energy storage volumes and small sizes.

In some embodiments, each battery assembly 156 powers the electrical motor 136 and the ESC module of the adjacent rotor unit 104 which generally require a high power output to operate the propeller 138. On the other hand, the electrical devices in the center unit 102 and the sensors generally require a small power output for operation, and may be powered by one or more separate sets of batteries.

In some embodiments, the aerial vehicle 100 comprises a power-balancing board in, for example, the center unit 102 for adjusting the power outputs of the battery assemblies 156 for balancing the power consumption rates thereof.

Figure 5:
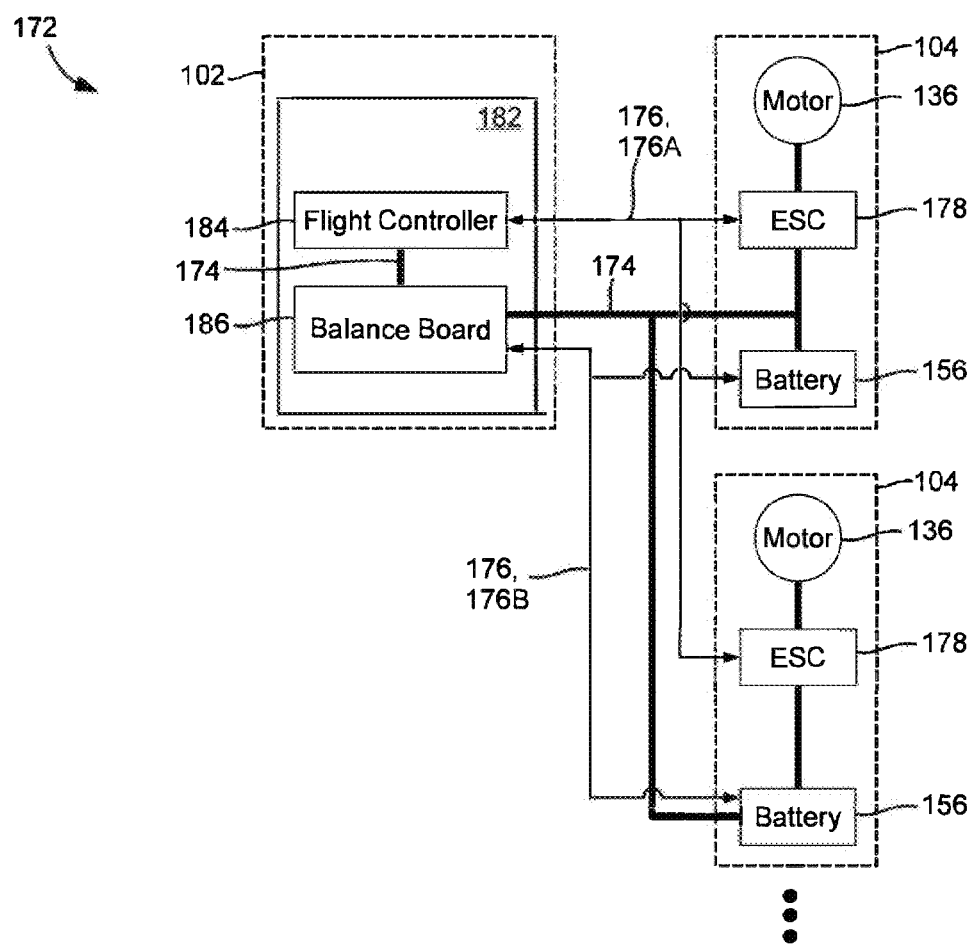
FIG. 5 is a schematic electrical diagram showing the powering of the aerial vehicle shown in FIG. 1A.

FIG. 5 is a schematic electrical diagram 172 showing the power management for the rotor units 104 of the aerial vehicle 100, wherein lines 174 with a thicker width represent power wires, and lines 176 (including lines 176A and 176B) with a narrower width represent signal wires.

As shown, the motor 136, ESC module 178, and battery assembly 156 of each rotor unit 104 are electrically coupled to a central control circuitry 182 in the center unit 102. The central control circuitry 182 comprises a flight control module 184 and a power-balancing board 186. The flight control module 184 determines the flight status of the aerial vehicle 100 and adjusts the propellers 138 accordingly. In particular, the flight control module 184 controls the ESC module 178 in each rotor unit 104 via signal wire 176A to adjust the speed of each motor 136 to individually control the speed of the corresponding propeller 138.

The power-balancing board 186 monitors the power output of each battery assembly 156 and individually and dynamically adjusts the power output thereof such that all battery assemblies 156 may have a similar power consumption rate.

In this embodiment, all battery assemblies 156 are interconnected in parallel in the power-balancing board 186. Therefore, the battery assemblies 156 having higher energy-storage will charge those having lower energy-storage. Consequently, all battery assemblies 156 achieve a same power consumption rate.

Figure 6:
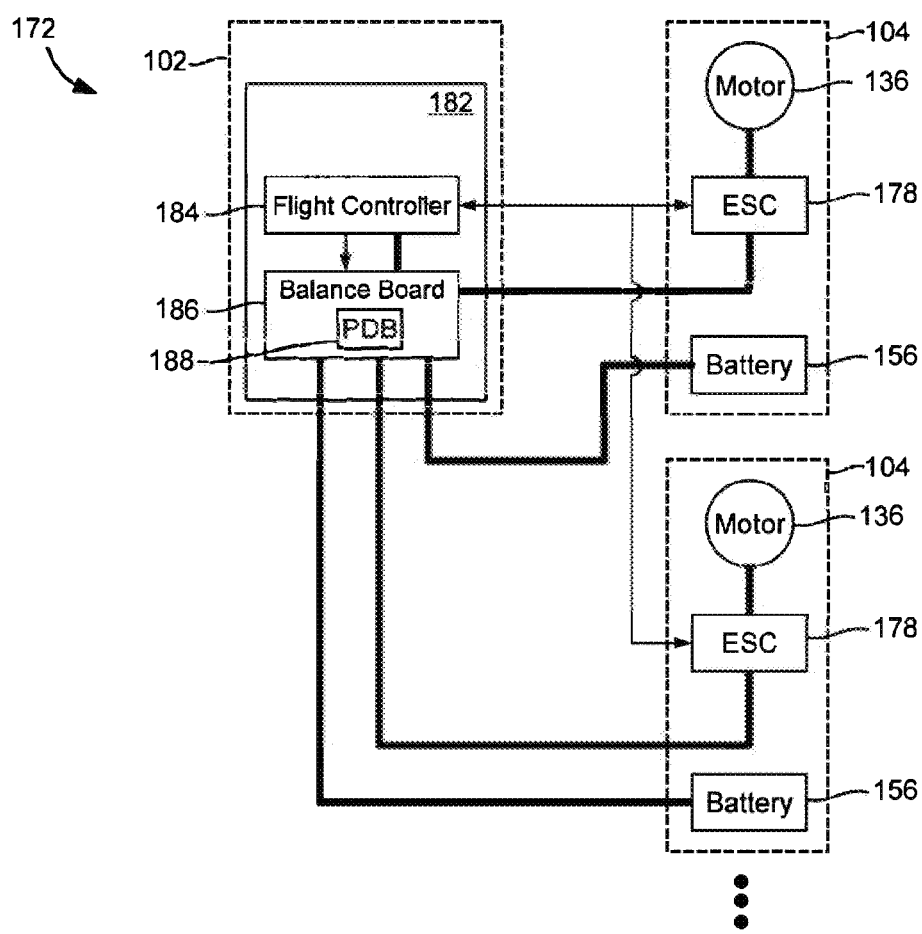
FIG. 6 is a schematic electrical diagram showing the powering of the aerial vehicle shown in FIG. 1A, according to some alternative embodiments of this disclosure.

In another embodiment as shown in FIG. 6, all battery assemblies 156 are electrically coupled to the power-balancing board 186, and the power-balancing board 186 distributes electrical power from the battery assemblies 156 to each ESC module 178 and motor 136.

The power-balancing board 186 in this embodiment monitors the power consumption of each battery assembly 156 and uses a power distribution board (PDB) 188 to dynamically adjust the power distribution. Consequently, the motor 136 experiencing heavy load may be powered by more than one battery assembly 156. On the other hand, a battery assembly 156 with high remaining energy storage may have high power drain rate (e.g., powering the motor 136 with heavy load, and/or powering more than one motors 136) until its remaining energy storage is about the same as that of other battery assemblies 156. Alternatively, the power-balancing board 186 may monitor the power consumption of each battery assembly 156, and use battery assemblies 156 having higher energy storage to charge those battery assemblies 156 having lower energy storage. The power-balancing board 186 may also monitor the charging of the battery assemblies 156 to prevent overheat and/or overcharging.

In an alternative embodiment, each battery assembly 156 powers its respective motor 136 via the ESC module 178 in the same rotor unit 104 and via a passive power-balancing circuitry such as an adjustable resistor (not shown) The power-balancing board 186 monitors the power consumption of each battery assembly 156 and dynamically adjusts the resistance of the adjustable resistor such that all battery assemblies 156 have the same load. A disadvantage of this method is that the power consumed by the adjustable resistors is wasted as heat.

In some embodiments, the aerial vehicle 100 comprises a variety of functional devices or subsystems distributed in the center unit 102 and rotor units 104.

Figure 7:
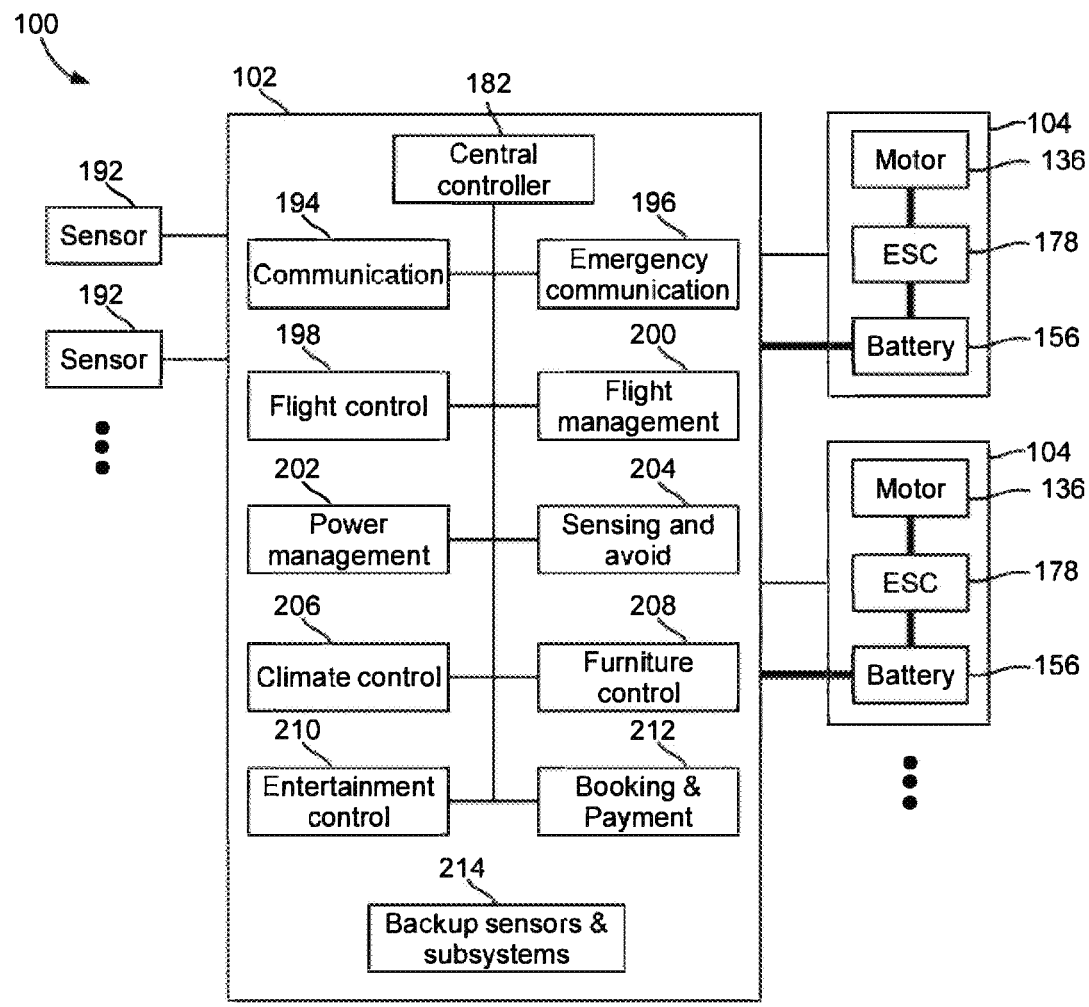
FIG. 7 is a schematic diagram showing the subsystems of the aerial vehicle shown in FIG. 1A.

FIG. 7 is a block diagram showing a functional structure of the aerial vehicle 100. As shown, one or more sensors 192 such as a Radio Frequency (RF) transceiver, a Global Positioning System (GPS) receiver, an inertial measurement unit (IMU) having accelerometer and gyroscope, a barometer, a magnetometer, a temperature sensor, video cameras, radar detectors, a microphone, and/or the like, are distributed on or in the center unit 102 and/or one or more rotor units 104 as needed.

The sensors 192 are all electrically (or optically if optical communication means is used) connected to the central control circuitry 182 in the center unit 102. The central control circuitry 182 is also electrically connected to a plurality of subsystems in the center unit 102 such as a communication subsystem 194 (e.g., for audio/video communication and/or data communication), an emergency communication subsystem 196, a flight control subsystem 198, a flight management subsystem 200, a power management subsystem 202, a detecting and avoiding subsystem 204, a climate control subsystem 206, a furniture control subsystem 208, an entertainment subsystem 210, a booking and payment subsystem 212, and/or other suitable subsystems.

The communication subsystem 194 establishes and maintains communications between the aerial vehicle 100 and remote systems such as a UAS Traffic Management (UTM) system for transmitting data and commands therebetween. The communication subsystem 196 also establishes and maintains audio/video communications between the passengers in the aerial vehicle 100 and remote systems such as phone systems.

The emergency communication subsystem 196 establishes and maintains communications in emergency situations between the aerial vehicle 100 and remote systems such as the UTM system, rescue systems, police systems, and/or the like.

The flight control subsystem 198 is connected to the ESC modules 178 of the rotor units 104 for controlling the operation of the motors 136 to adjust the flight status. The flight control subsystem 198 comprises the flight controller 184 shown in FIGS. 5 and 6.

The flight management subsystem 200 manages the flight operation of the aerial vehicle 100 such as the destinations, flight routes, departure time, arrival time, and/or the like. The flight management subsystem 200 may communicate with the UTM systems for flight management. The flight management subsystem 200 may also provide a user interface (via a display in the compartment) for passenger to interact with the UTM persons to plan, monitor, and/or modify the flight such as inputting a new destination, revising details of flight (e.g., detour), reporting informing of UTM persons coordination/actions, and the like.

The flight control subsystem 198 and the flight management subsystem 200 may be denoted as "onboard autopilot" which may automatically control and manage the flight of the aerial vehicle 100 without the intervention of a human pilot.

The power management subsystem 202 is connected to the battery assemblies 156 of the rotor units 104 for managing the power outputs thereof. The power management subsystem 202 comprises the power-balancing board 186 of the embodiments shown in FIGS. 5 and 6.

The detecting and avoiding subsystem 204 uses suitable sensors and communication means on the aerial vehicle 100 to detect and avoid other aircrafts and objects. For example, the detecting and avoiding subsystem 204 may use Automatic Dependent Surveillance-Broadcast (ADS-B) to detect and avoid "cooperative" aircrafts that use the same or compatible technologies, and use sensors such as radar to detect and avoid "non-cooperative" aircrafts and objects.

The detecting and avoiding subsystem 204 may also comprise an interface to and integrated with the onboard autopilot (the flight control subsystem 198 and the flight management subsystem 200) to manipulate the aerial vehicle 100 for collision avoidance and to perform real-time route planning/modification if necessary.

The detecting and avoiding subsystem 204 maintains real-time communication with the onboard autopilot for UTM-directed flight planning. In embodiments where the aerial vehicle 100 is remotely controlled by a ground control station, the detecting and avoiding subsystem 204 maintains real-time communication with the mission control pilot at the ground control station for UTM-directed flight planning. In some embodiments, the detecting and avoiding subsystem 204 maintains real-time communication with both the onboard autopilot and the mission control pilot at the ground control station for UTM-directed flight planning.

The detecting and avoiding subsystem 204 also comprises landing detecting and avoiding functions to ensure safety during landing, by using necessary sensors such as visual/infrared cameras, Light Detection and Ranging (LIDAR) sensors, and/or the like to detect the objects or people at or about the landing location.

The climate control subsystem 206 controls and adjusts the environmental conditions in the compartment 122 such as temperature, air pressure, air refreshing, and/or the like to provide a comfortable environment for passengers.

The furniture control subsystem 208 allows passengers to adjust the conditions of the furniture in the compartment 122 such as the height, position, inclination, and/or the like of tables and/or seats.

The entertainment subsystem 210 provides entertainment to passengers. The entertainment subsystem 210 may also provide advertisements.

The booking and payment subsystem 212 allows passengers to book flights such as inputting a new destination, confirming details of flight reservation, and the like, and make required payments. The booking and payment subsystem 212 may also be associated with a flight reservation app for facilitating passengers to book flights and make payments.

As shown in FIG. 7, the center unit 102 may also comprise backup sensors and subsystems 214 corresponding to one or more flight and/or safety related subsystems such as motors 136, ESCs 178, battery assemblies 156, the emergency communication subsystem 196, the flight control subsystem 198, the flight management subsystem 200, the power management subsystem 202, the detecting and avoiding subsystem 204, such that one or more backup sensors and subsystems 214 may automatically or manually substitute corresponding safety-related subsystems when the safety-related subsystems fail.

The backup sensors and subsystems 214 provide additional redundancies to the aerial vehicle 100 for navigation/flight reliability and safety. In some embodiments, the sensors and subsystems of the aerial vehicle 100, including all backup sensor and subsystems, are of high-standard commercial grade (e.g., commercial grade autopilots or proven autopilots) with double or triple redundancy for achieving safety levels comparable to general aviation or commercial aviation. Moreover, the aerial vehicle 100 generally uses higher-quality components, components with known low-failure rates for improved reliability. The aerial vehicle 100 may also comprise onboard failure prediction for critical flight components such as motors 136 and ESCs 178.

In above embodiments, the aerial vehicle 100 is electrically powered and uses battery assemblies 156 as the power source. In some alternative embodiments, the aerial vehicle 100 may use hybrid powertrain with fossil-fuel-powered engine/generator for extended flight ranges. For example, in one embodiment, the aerial vehicle 100 may comprise a gasoline engine for driving a generator to charge the battery assemblies 156.

Figure 8A:
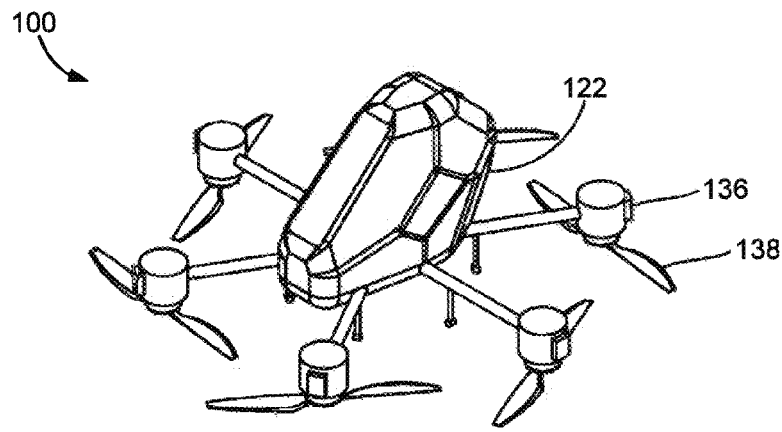
FIGS. 8A to 8C are perspective, front, and plan views, respectively of a battery-powered, multiple-rotor, pilotless, personal-transportation aerial vehicle having a center unit and a plurality of rotor units, according to some alternative embodiments of this disclosure.
Figure 8B:
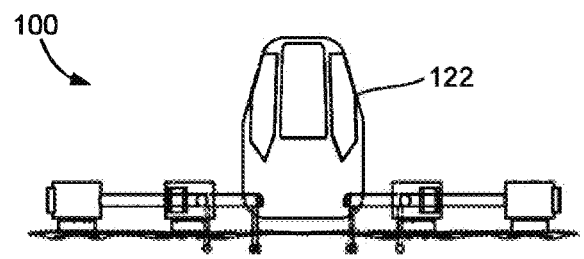
Figure 8C:
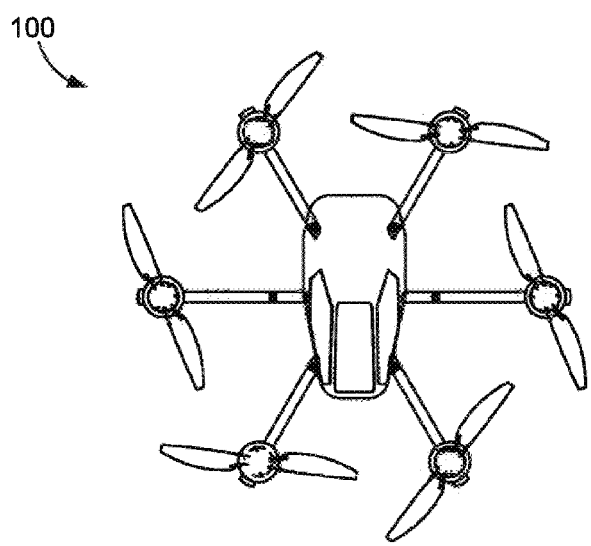

FIGS. 8A to 8C show an aerial vehicle 100 in some alternative embodiments. The aerial vehicle 100 in these embodiments is generally the same as that shown in FIGS. 1A to 1C except that in these embodiments, the propellers 138 are below the respective motors 136 (i.e., a pusher configuration) for "pushing" the aerial vehicle 100 off the ground.

In some embodiments, the battery-powered aerial vehicle 100 may alternatively be manually operated by one of the passengers as a pilot if necessary.

In above embodiments, the compartment 122 is at an elevation substantively above the plane of the connecting arms 106 (so called "lower attachment"). In some alternative embodiments, the compartment 122 may be at any other suitable elevations with respect to the plane of the connecting arms 106.

Figure 9A:
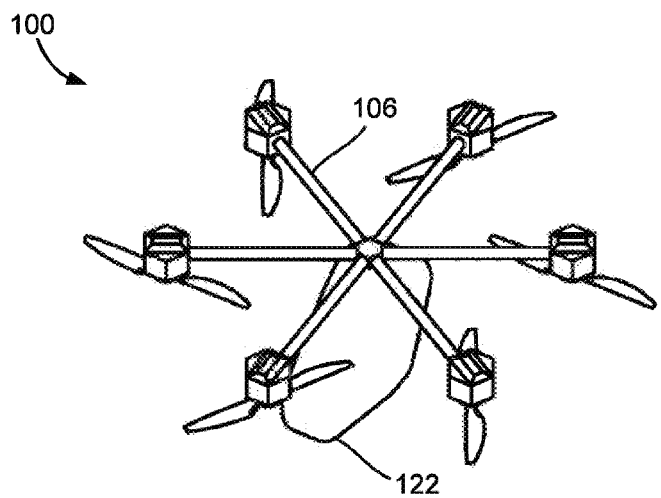
FIGS. 9A to 9C are perspective, front, and plan views, respectively of a battery-powered, multiple-rotor, pilotless, cargo-transportation aerial vehicle having a center unit and a plurality of rotor units, according to some alternative embodiments of this disclosure, wherein the compartment is at an elevation substantively under the plane of the connecting arms.
Figure 9B:
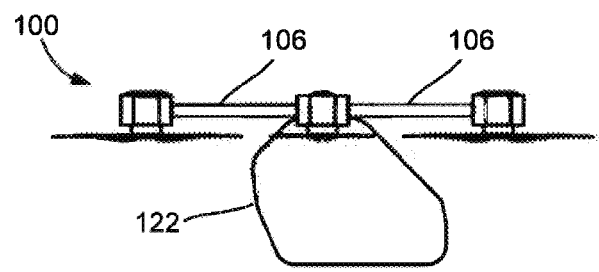
Figure 9C:
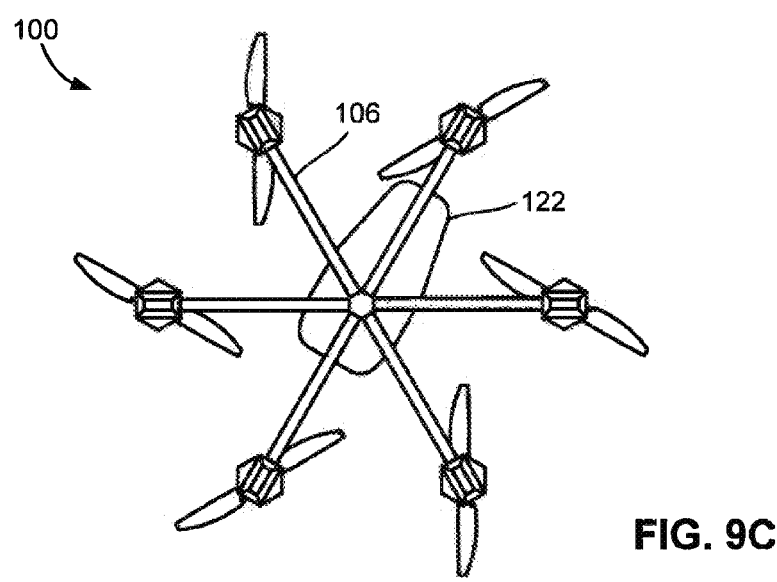

For example, FIGS. 9A to 9C show an aerial vehicle 100 in some alternative embodiments. The aerial vehicle 100 in these embodiments is generally the same as that shown in FIGS. 1A to 1C except that in these embodiments, the compartment 122 is at an elevation substantively under the plane of the connecting arms 106 (so called "upper attachment").

Although in above embodiments, the battery-powered aerial vehicle 100 is a personal transportation drone for transporting passengers, in some alternative embodiments, the battery-powered aerial vehicle 100 may be a cargo transportation drone for carrying and/or transporting goods and/or suitable objects. The compartment 122 in these embodiments is a cargo compartment for accommodating goods during transportation.

Figure 10:
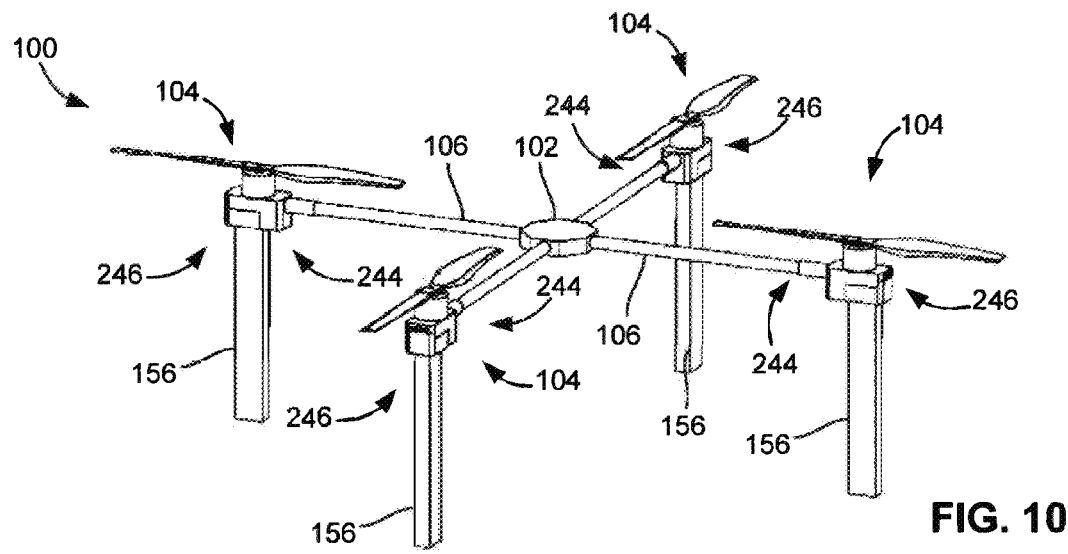
FIG. 10 is a perspective view of a battery-powered, multiple-rotor, pilotless, cargo-transportation aerial vehicle having a center unit and a plurality of rotor units, according to yet some alternative embodiments of this disclosure.

FIG. 10 shows a multiple-rotor, battery-powered cargo aerial vehicle 100 for transporting goods of a generally small or moderate weight. In these embodiments, the aerial vehicle 100 comprises a center unit 102 and a plurality of rotor units 104 generally uniformly distributed about the center unit 102 and coupled thereto via a plurality of coupling components 106 such as connecting arms. For example, the multiple-rotor UAV 100 shown in FIG. 10 is a so-called quadcopter having a center unit 102 and four generally identical rotor units 104.

The center unit 102 comprises a compartment (not shown) for accommodating the goods. The compartment may be at any other suitable elevations with respect to the plane of the connecting arms 106. For example, in these embodiments, the compartment is at an elevation substantively under the plane of the connecting arms 106.

Figure 11:
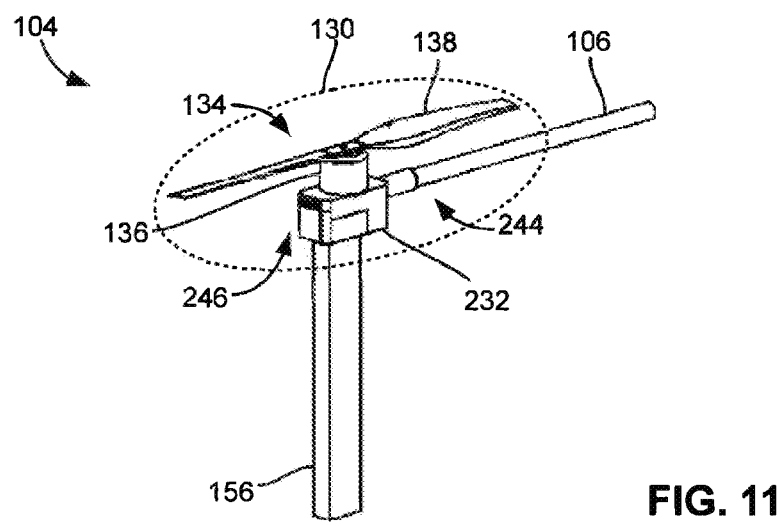
FIG. 11 is a perspective view of a rotor unit of the aerial vehicle shown in FIG. 10.
Figure 12:
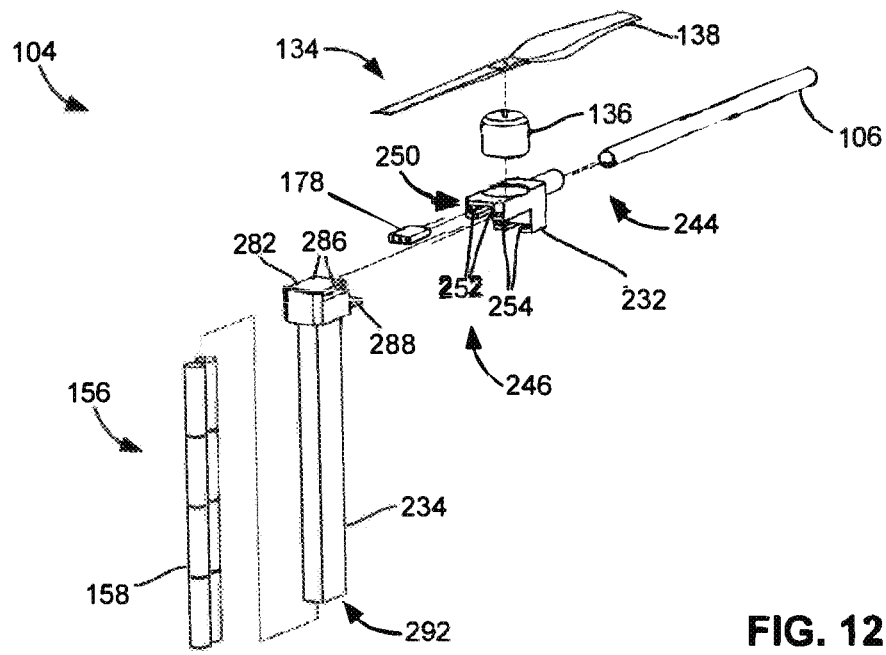
FIG. 12 is a perspective exploded view of the rotor unit shown in FIG. 11.

FIGS. 11 and 12 show one of the rotor units 104. As shown, the rotor unit 104 comprises an electrically-powered propelling module 130 coupled to the center unit 102 via a coupling component 106 such as a cylindrical connecting arm, and a battery assembly 156 physically and electrically coupled to the propelling module 130 for providing electrical power thereto. The propelling module 130 comprises a base structure 232 as a mounting base for receiving and mounting a rotor assembly 134 and an ESC module 178. The base structure 232 is also coupled to the connecting arm 106 for mounting the propelling module 130 to the center unit 102.

The rotor assembly 134 comprises an electrical motor 136 and a propeller or blade 138 driven by the electrical motor 136. The ESC module 178 is electrically coupled to the electrical motor 136 for controlling the speed thereof.

The battery assembly 156 comprises a battery pod or housing 234 and one or more high-energy-density battery cells 158 received in the battery housing 234 for providing electrical power to the ESC module 178 and the electrical motor 136. The battery cells 158 may be any suitable battery cells such as metal-clad batteries, Lithium-ion batteries, Lithium-ion polymer (Li—Po) batteries, and the like.

FIGS. 13A to 13H show the detail of the base structure 232. As shown, the base structure 232 comprises an "L"-shaped main body 236 having a circular recess 238 on a top surface 240 thereof for receiving a motor 136 of a rotor assembly 134. The base structure 232 also comprises an arm connector extending from a rear surface 242 of the main body 236 on a proximal or rear side 244 thereof for coupling to the connecting arm 106.

On the distal or front side 246, the main body 236 comprises a slot extending inwardly from a front surface 248 into the main body 236 and forming a chamber 250 with a front-side opening for receiving the ESC module 178. The main body 236 also comprises a pair of upper channels or grooves 252 and a pair of lower channels or grooves 254 for sliding in and coupling the battery assembly 156.

Figure 13A:
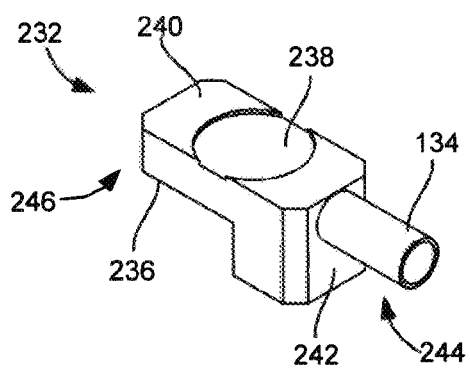
Figure 13B:
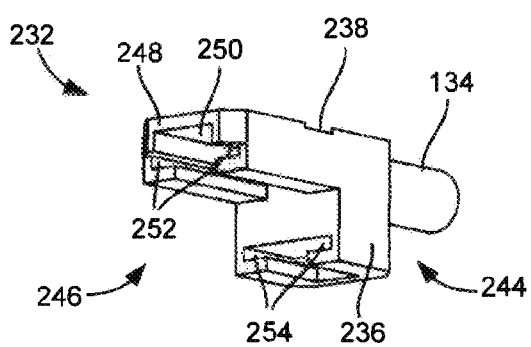
Figure 13C:
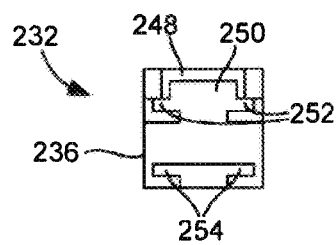
Figure 13D:
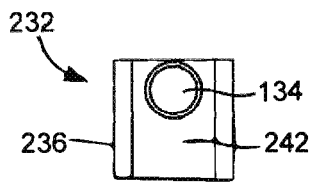
Figure 13E:
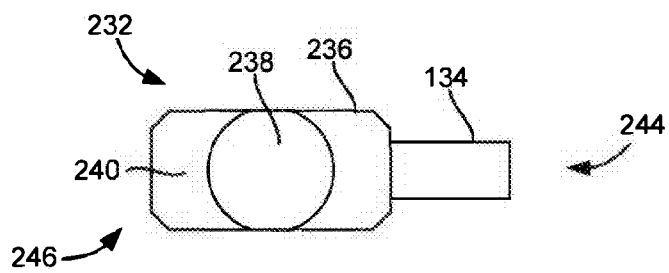
Figure 13F:
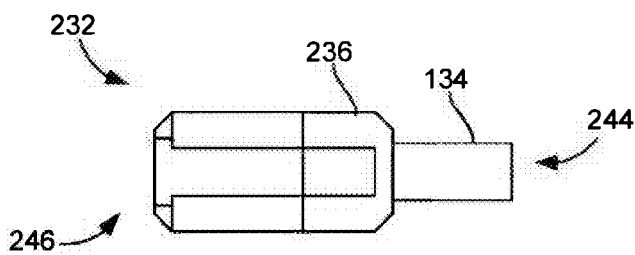
Figure 13G:
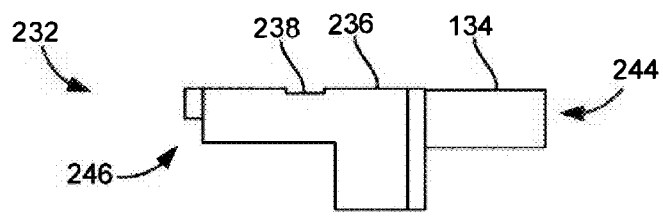
Figure 13H:
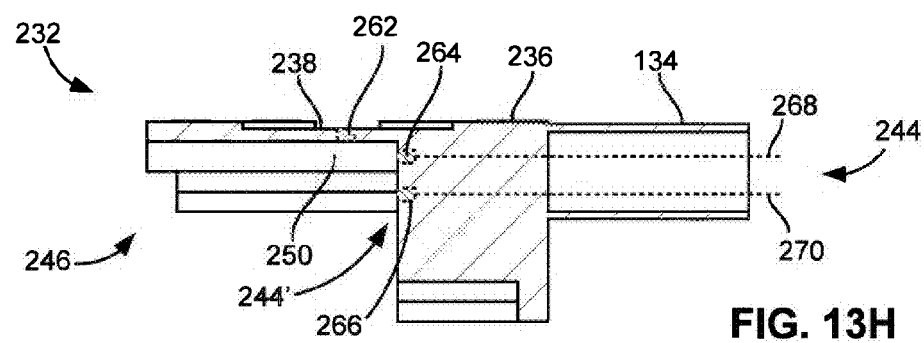

FIG. 13H is a schematic cross-sectional view of the base structure 232. As shown, the main body 236 of the base structure 232 comprises three sets of electrical contact terminals 262, 264 and 266 about the chamber 250.

Figure 15:
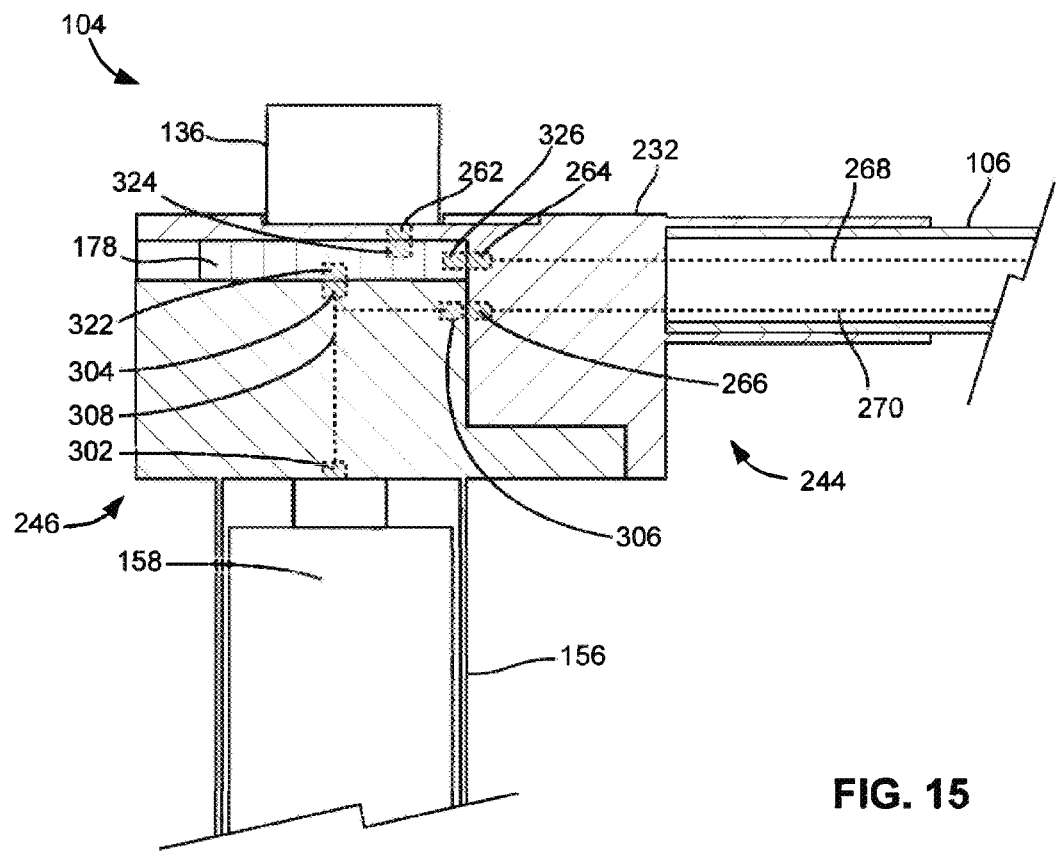
FIG. 15 is a schematic cross-section view of a portion of the rotor unit shown in FIG. 11, illustrating the electrical connections thereof.

The first set of electrical contact terminals 262 extends from the circular recess 238 into the chamber 250 for electrically coupling the corresponding electrical terminals of the motor 136 to be located thereabove (not shown in FIG. 13H; see FIG. 15) to the corresponding electrical terminals of the ESC module 178 to be located therebelow (not shown in FIG. 13H; see FIG. 15). Thus, the first set of electrical contact terminals 262 is configured for electrically coupling the motor 136 to the ESC module 178.

The second set of electrical contact terminals 264 is located at a proximal end 244' of the chamber 250 for electrically coupling to corresponding electrical terminals of the ESC module 178 (not shown in FIG. 13H; see FIG. 15). The second set of electrical contact terminals 264 is also electrically coupled to a set of conductive wires 268 which extends through the arm connector and the connecting arm 106 (not shown in FIG. 13H; see FIG. 15) to the center unit 102 and is electrically coupled to a flight control module 184 of a central control circuitry 182 therein (similar to FIGS. 5 and 6, described in more detail later). Thus, the second set of electrical contact terminals 264 and the wires 268 are configured for electrically coupling the ESC module 178 to the central control circuitry 182 in the center unit 102.

The third set of electrical terminals 266 is located in proximity with or adjacent to the proximal ends 244' of the upper channels 252 for electrically coupling to corresponding electrical terminals of the battery assembly 156 (not shown in FIG. 13H; see FIG. 15). The third set of electrical contact terminals 266 is also electrically coupled to a set of conductive wires 270 which extends through the arm connector and the connecting arm 106 (not shown in FIG. 13H; see FIG. 15) to the center unit 102 and is electrically coupled to a power balancing board 186 of the central control circuitry 182 therein (see FIGS. 6 and 7). Thus, the third set of electrical contact terminals 266 and the wires 270 are configured for electrically coupling the battery assembly 156 to the central control circuitry 182 in the center unit 102.

FIGS. 14A to 14E show the battery housing 234 of the battery assembly 156. In this embodiment, the battery housing 234 is made of a rigid material such as steel, rigid plastic, and the like. The battery housing 234 comprises a head portion 282 and a main body 284. The head portion 282 comprises a pair of upper tracks or ridges 286 matching the upper channels 252 of the base structure 232, and a pair of lower tracks or ridges 288 matching the lower channels 254 thereof. The main body 284 of the battery housing 234 has a hollow chamber 290 and a removable bottom wall 292 for receiving one or more battery cells 158. In another embodiment, the battery housing 234 comprises a fixed bottom wall 292 and a removable head portion 282.

Figure 14A:
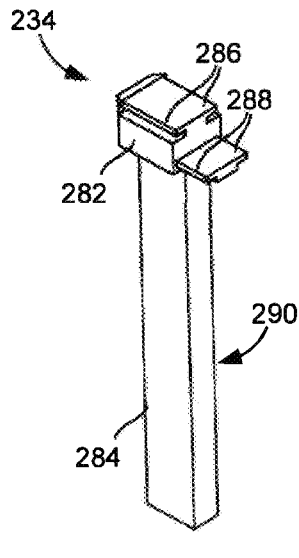
Figure 14B:
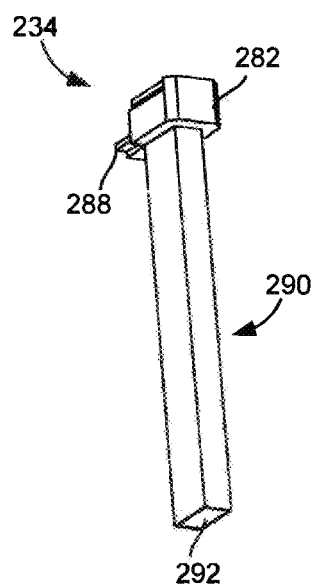
Figure 14C:
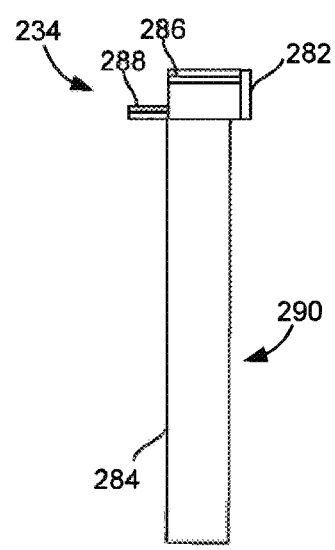
Figure 14D:
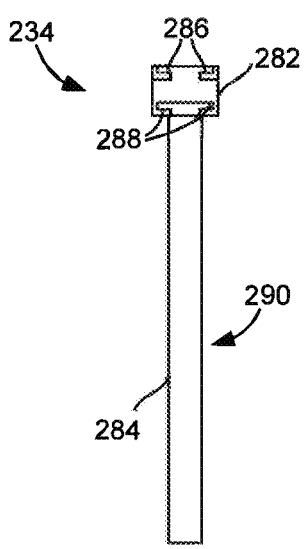
Figure 14E:
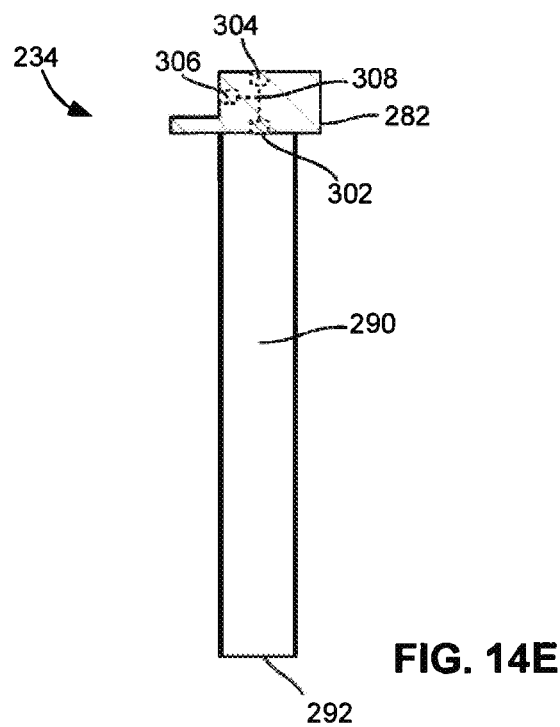

FIG. 14E is a schematic cross-sectional view of the battery housing 234. As shown, the head portion 282 of the battery housing 234 comprises three sets of electrical contact terminals 302, 304, and 306 electrically interconnected with each other via suitable wiring 308.

The first set of electrical contact terminals 302 is configured for electrically coupling to the battery cells in the chamber 290 thereof. The second set of electrical contact terminals 304 is configured for electrically coupling to the ESC module 178 to be located thereabove. The third set of electrical contact terminals 306 is configured for electrically coupling to the third set of electrical terminals 266 in the base structure 232.

Referring again to FIG. 12, to assemble the aerial vehicle 100, the propeller 138 is coupled to a shaft of the electrical motor 136 which is mounted onto the base structure 232 by suitable fastening means such as screws, nails, glue, and the like. An ESC module 178 is slid into the chamber 250 of the base structure 232.

To assemble the battery assembly 156, a set of battery cells 158 is inserted into the battery housing 234 via the removable bottom wall 292 thereof. The assembled battery assembly 156 is then coupled to the base structure 232 by sliding the head portion 282 of the battery housing 234 into the base structure 232 and engaging the tracks 286 and 288 of the head portion 282 with channels 252 and 254, respectively. After the motor 136, the ESC module 178, and the battery assembly 156 are mounted to the base structure 232, they are also electrically interconnected. Then, the connecting arm 106 is coupled to the arm connector of the base structure 232 and the wirings 268 and 270 are extended through the connecting arm 106 for connecting to the center unit 102. A rotor unit 104 is thus assembled.

After assembling a required number of rotor units 104, such as the four rotor units 104 in the example shown in FIG. 10, each assembled rotor unit 104 is coupled to the center unit 102 by electrically coupling the wirings 268 and 270 to respective electrical connectors (not shown) of the center unit 102, and then mounting the connecting arms 106 to the center unit 102. The aerial vehicle 100 is then assembled. As shown in FIG. 10, in addition to providing electrical power to various components, the battery assemblies 156 may also act as supporting legs.

FIG. 15 is a schematic cross-section view of a portion of the rotor unit 104 with the motor 136, the ESC module 178, the battery assembly 156 mounting to the base structure 232, for illustrating the electrical connections thereof. As shown, the ESC module 178 comprises three sets of electrical terminals 322, 324, and 326 for receiving power from of the battery assembly 156, powering and communicating with the electrical motor 136, and communicating with the central control circuitry 182, respectively.

The first set of electrical terminals 322 is located on a bottom wall of the ESC module 178 and is in electrical contact with the second set of electrical terminals 304 of the battery assembly 156 which is subsequently electrically coupled to the battery cells 158.

The second set of electrical terminals 324 is located on a top wall of the ESC module 178 and is in electrical contact with the first set of electrical terminals 262 of the base structure 232 which is subsequently electrically coupled to corresponding electrical terminals (not shown) of the electrical motor 136.

The third set of electrical terminals 326 is located on a rear wall thereof and is in electrical contact with the second set of electrical terminals 324 of the base structure 232 which, as described above, is subsequently electrically coupled to the central control circuitry 182 in the center unit 102 via conductive wiring 268.

The first set of electrical terminals 302 of the battery assembly 156 is electrically coupled to the battery cells 158. The second set of electrical terminals 304 of the battery assembly 156 is electrically coupled to the electrical terminals 322 of the ESC module 178. The third set of electrical terminals 306 of the battery assembly 156 is electrically coupled to the third set of electrical terminals 266 of the base structure 232 which, as described above, is subsequently electrically coupled to the central control circuitry 182 in the center unit 102 via conductive wiring 270.

In this manner, the battery assembly 156 powers the electrical motor 136 via the ESC module 178, and powers the central control circuitry 182 (see FIGS. 5 and 6) in the center unit 102 via the wire 270. The central control circuitry 182 in the center unit 102 communicates with the ESC module 178 via the wire 268 for adjusting the operation of the electrical motor 136.

Figure 16:
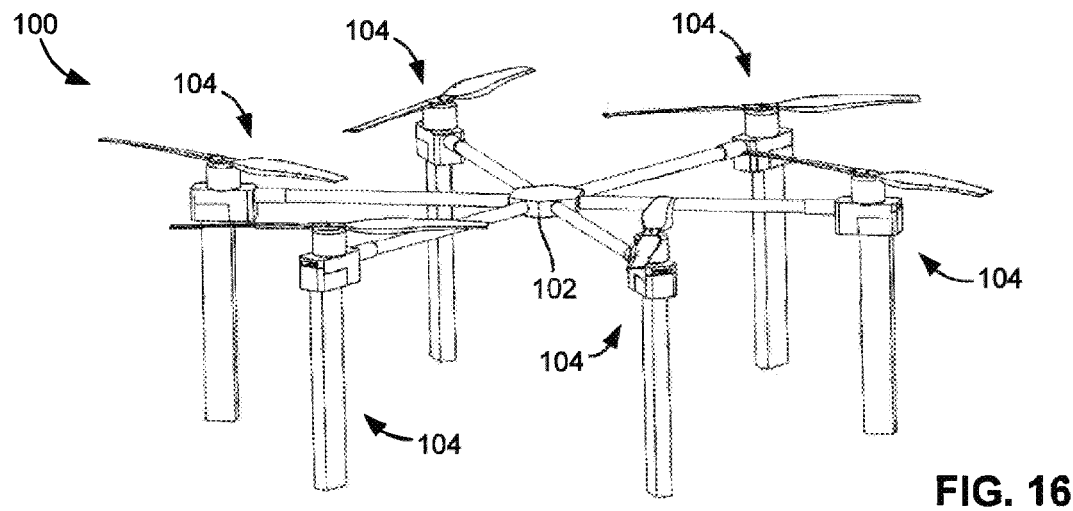
FIG. 16 is a perspective view of a battery-powered, multiple-rotor, pilotless, cargo-transportation aerial vehicle, according to still some alternative embodiments of this disclosure, wherein the aerial vehicle comprises a center unit and six rotor units.

FIG. 16 shows an aerial vehicle 100 in an alternative embodiment. The aerial vehicle 100 in this embodiment is a so-called "hexacopter" and is similar to that shown in FIG. 10 except that the aerial vehicle 100 in this embodiment comprises one center unit 102 having a cargo compartment (not shown) and six (6) rotor units 104.

Figure 17:
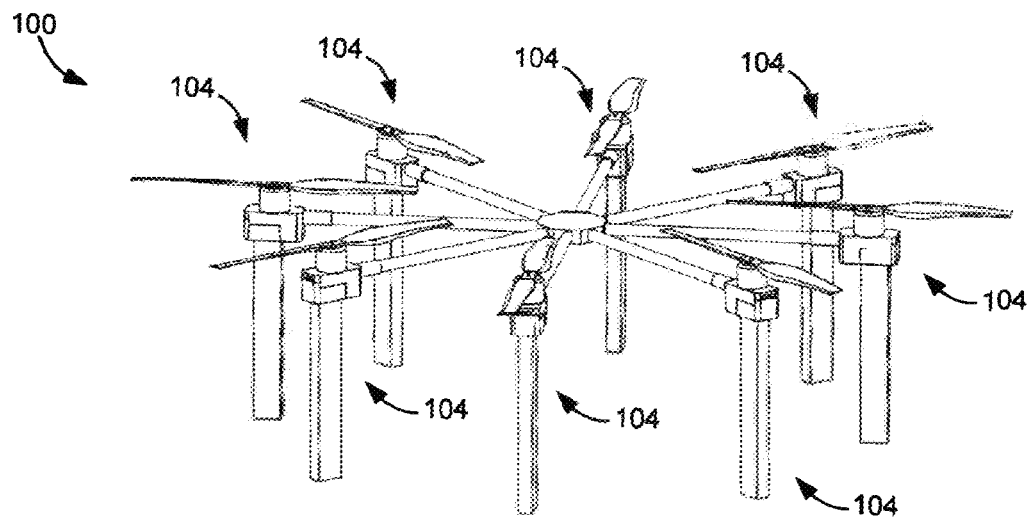
FIG. 17 is a perspective view of a battery-powered, multiple-rotor, pilotless, cargo-transportation aerial vehicle, according to still some alternative embodiments of this disclosure, wherein the aerial vehicle comprises a center unit and eight rotor units.

FIG. 17 shows an aerial vehicle 100 in another embodiment. The aerial vehicle 100 in this embodiment is a so-called "octocopter" and is similar to that shown in FIG. 10 except that the aerial vehicle 100 in this embodiment comprises one center unit 102 having a cargo compartment (not shown) and eight (8) rotor units 104.

In above embodiments, each rotor unit 104 comprises a battery assembly 156. The aerial vehicle 100 in these embodiments has the advantage of generally uniform weight distribution. In some alternative embodiments, some rotor units 104 may not comprise any battery assemblies.

Figure 18:
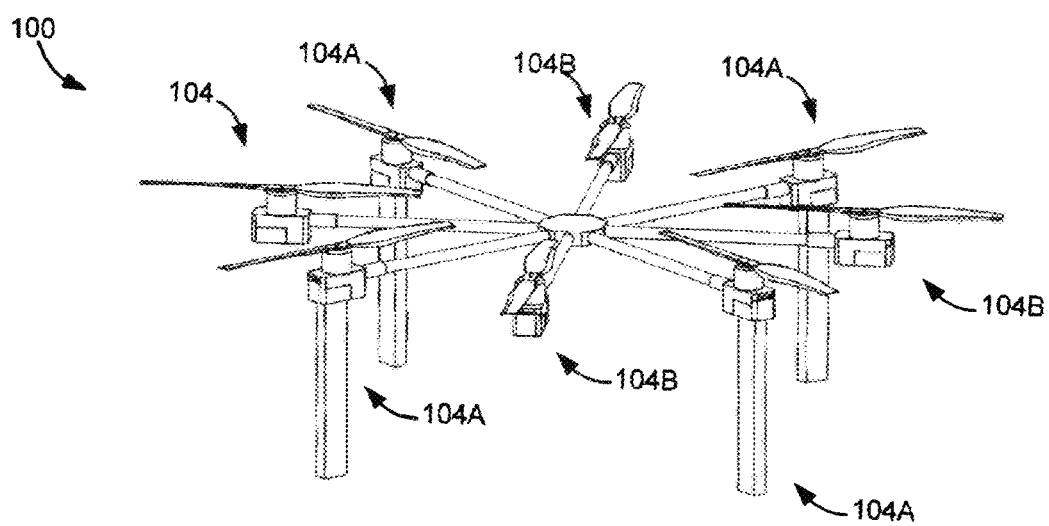
FIG. 18 is a perspective view of a battery-powered, multiple-rotor, pilotless, cargo-transportation aerial vehicle, according to still some alternative embodiments of this disclosure, wherein the aerial vehicle comprises a center unit, four rotor units with battery assembly, and four rotor units without battery assembly.

For example, in one embodiment as shown in FIG. 18, an octocopter 100 comprises four rotor units 104A each having a battery assembly 156 and four rotor units 104B with no battery assembly, wherein the eight rotor units 104A and 104B are circumferentially uniformly arranged about a center unit 102. Each rotor unit 104A with battery assembly is circumferentially intermediate a pair of adjacent rotor units 104B without battery assembly In above embodiments, each battery assembly 156 is also used as a supporting leg. In some embodiments including the embodiments described above, one or more supporting legs may each comprise a battery assembly 156 (and optionally other components such as wheels), wherein a battery assembly 156 may be enclosed in the supporting leg (and thus act as a supporting leg), be part of the supporting leg, or attached to, mounted to, or otherwise coupled to a supporting leg.

In some embodiments, one or more battery assemblies may extend downwardly from at least one of the one or more propelling modules which, however, do not act as supporting legs. For example, such one or more battery assemblies may be shorter than other battery assemblies and/or the supporting legs and thus do not act as supporting legs.

Figure 19A:
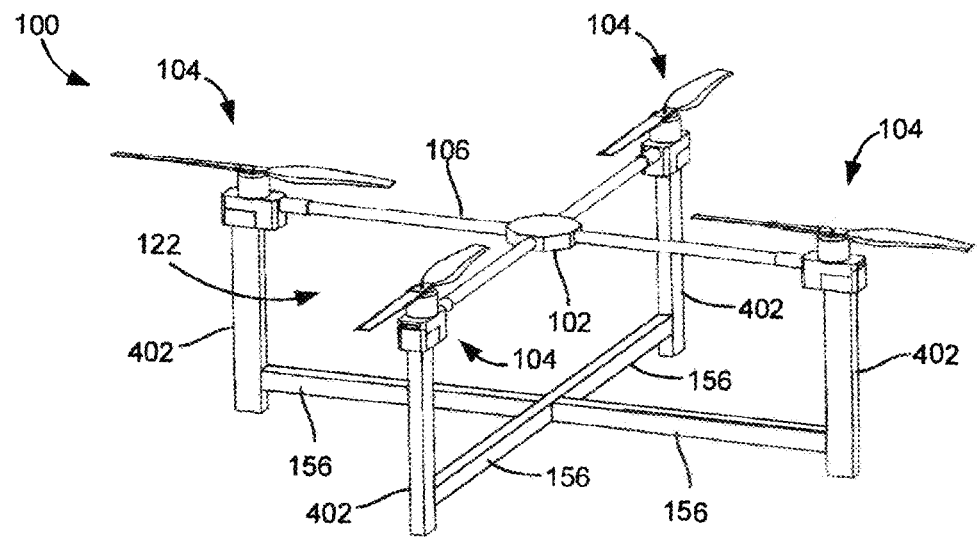
FIG. 19A is a perspective view of a battery-powered, multiple-rotor, pilotless, cargo-transportation aerial vehicle, according to still some alternative embodiments of this disclosure, wherein the aerial vehicle comprises a center unit, four rotor units each having a supporting leg, and four battery assemblies as crossbars between the supporting legs.

In some embodiments as shown in FIG. 19A, each rotor unit 104 of the aerial vehicle 100 comprises a supporting leg 402. The battery assemblies 156 are coupled to the supporting legs 402 as horizontal crossbars. In these embodiments, the connecting arms 106, the battery assemblies 156, and the supporting legs 402 form a compartment 122 for receiving therein goods.

Figure 19B:
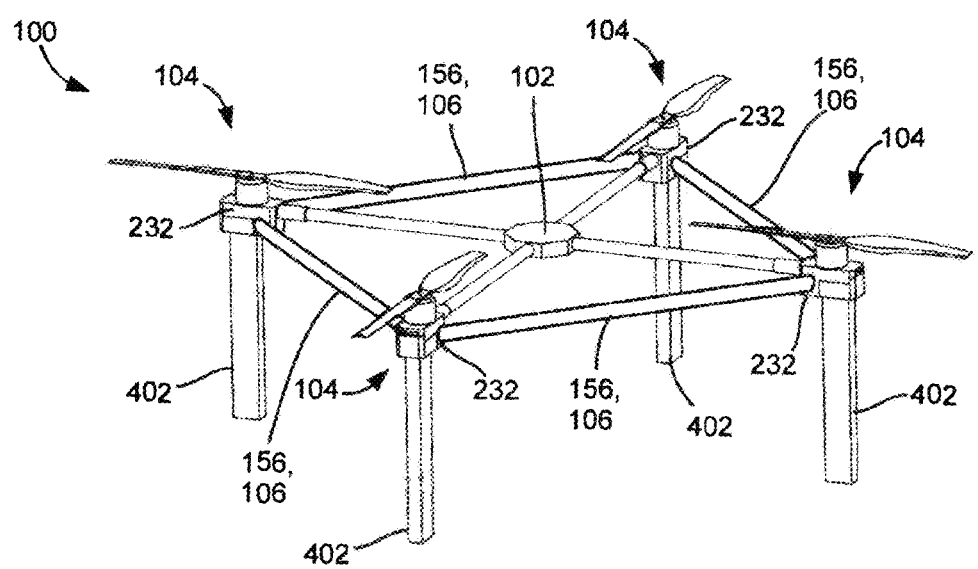
FIG. 19B is a perspective view of a battery-powered, multiple-rotor, pilotless, cargo-transportation aerial vehicle, according to still some alternative embodiments of this disclosure, wherein the aerial vehicle comprises a center unit, four rotor units each having a supporting leg, and four battery assemblies as connecting arms between base structures of the rotor units.

In some embodiments as shown in FIG. 19B, each rotor unit 104 of the aerial vehicle 100 comprises a supporting leg 402. The battery assemblies 156 are coupled to the base structures 232 of the rotor units 104 as horizontal connecting arms 106. In these embodiments, the battery assemblies 156 (also functioning as the connecting arms 106) and the supporting legs 402 enclose a space for receiving a compartment (not shown).

Figure 19C:
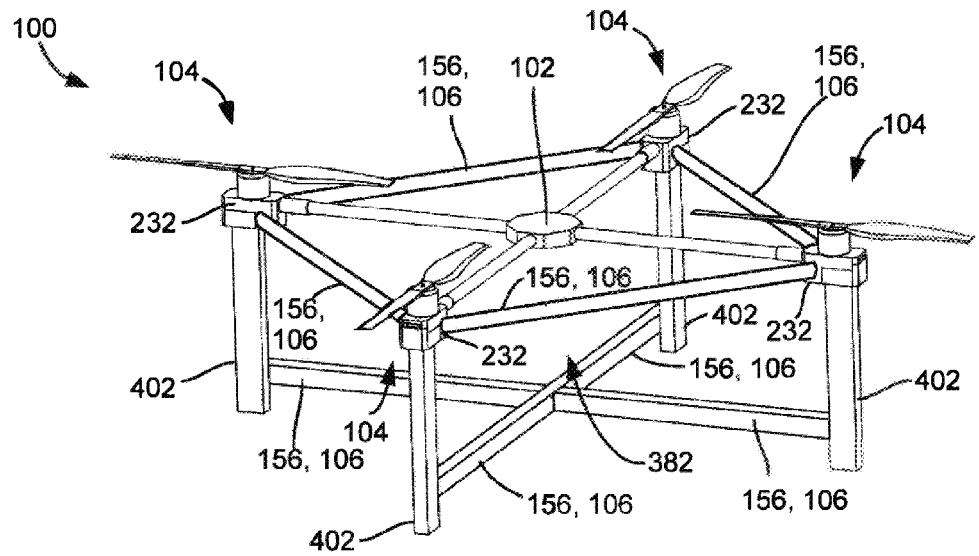
FIG. 19C is a perspective view of a battery-powered, multiple-rotor, pilotless, cargo-transportation aerial vehicle, according to some alternative embodiments of this disclosure, wherein the aerial vehicle comprises a center unit, four rotor units each having a supporting leg, and a cage formed by connecting arms and supporting legs, the cage comprising the battery assemblies.

In some embodiments as shown in FIG. 19C, each rotor unit 104 of the aerial vehicle 100 comprises a supporting leg 402. A plurality of connecting arms 106 are coupled between the base structures 232, between the base structure 232 and the center unit 102, and/or between the supporting legs 402 so as to form a cage 382. The frame of the cage 382 (such as the connecting arms 106 and the supporting legs 402) or any suitable portion thereof may comprise the battery assemblies 156.

In some embodiments, the center unit 102 comprises a cage 382 formed by a framework separated from the connecting arms 106 and the supporting legs 402. The framework or any suitable portion thereof may comprise the battery assemblies 156.

Figure 19D:
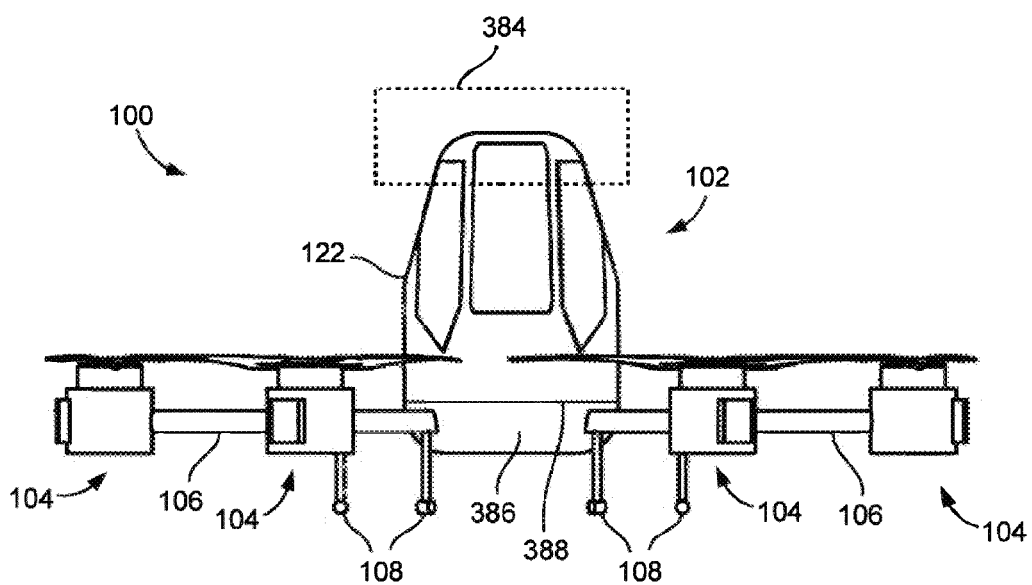
FIG. 19D is a perspective view of a battery-powered, multiple-rotor, pilotless, cargo-transportation aerial vehicle, according to some alternative embodiments of this disclosure, wherein the aerial vehicle comprises a center unit having a compartment, and six rotor units each having a supporting leg and coupled to a lower portion of the compartment, the compartment comprising at least some electrical components in an upper portion thereof and the battery assemblies in a lower portion thereof.

In some embodiments as shown in FIG. 19D, the compartment 122 comprises a plurality of sensors and/or electrical devices therein. A plurality of rotor units 104 are coupled to a lower portion of the compartment 122 of the center unit 102. At least a portion of the sensors and electrical components sensitive to electromagnetic interference are arranged on a distal portion 384 of the compartment 122 such as a top or upper portion of the compartment 122. The compartment 122 also comprises the battery assemblies 156 on a proximal portion 386 thereof such as a bottom or lower portion of the compartment 122 under the floor 388 such that the battery assemblies 156 are at a sufficient distance to the sensors and electrical components to avoid electromagnetic interference thereto.

Figure 19E:
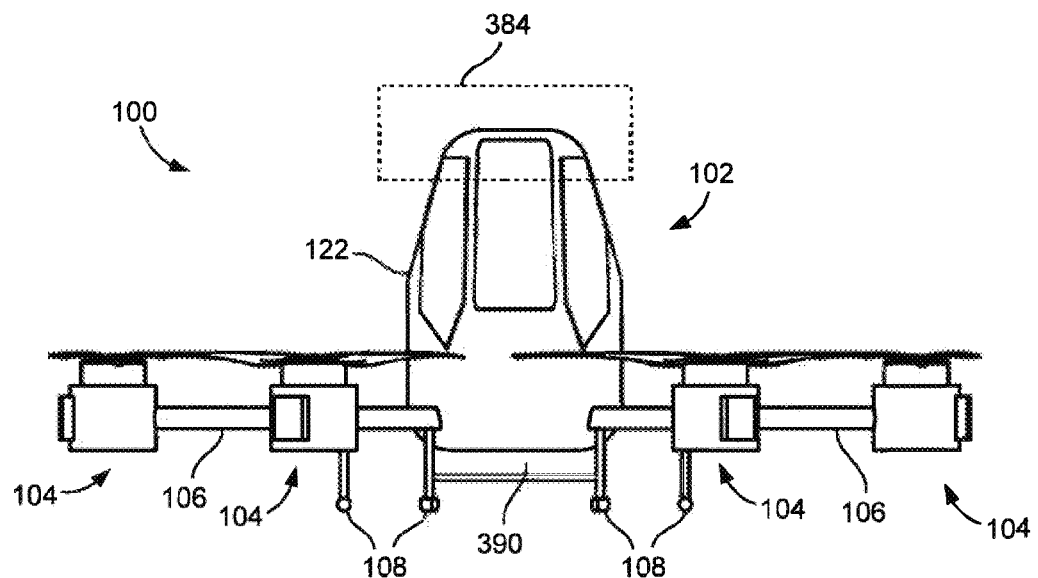
FIG. 19E is a perspective view of a battery-powered, multiple-rotor, pilotless, cargo-transportation aerial vehicle, according to some alternative embodiments of this disclosure, wherein the aerial vehicle comprises a center unit having a compartment, a cage under the compartment, and six rotor units each having a supporting leg, the compartment of the center unit comprising at least some electrical components in an upper portion thereof and the cage comprising the battery assemblies.

In some embodiments as shown in FIG. 19E, the center unit 102 also comprises a cage 390 under the compartment 122. The cage 390 may be formed in a manner similar to the cage 282 described above such as formed by the connecting arms 106 and/or supporting legs 402 or alternatively formed by a framework separated from the connecting arms 106 and supporting legs 402. The cage 390 or any suitable portion thereof may comprise the battery assemblies 156 such that the battery assemblies 156 are at a sufficient distance to the sensors and electrical components to avoid electromagnetic interference thereto. In some embodiments, the battery assemblies 156 may be located within the cage 390.

Figure 19F:
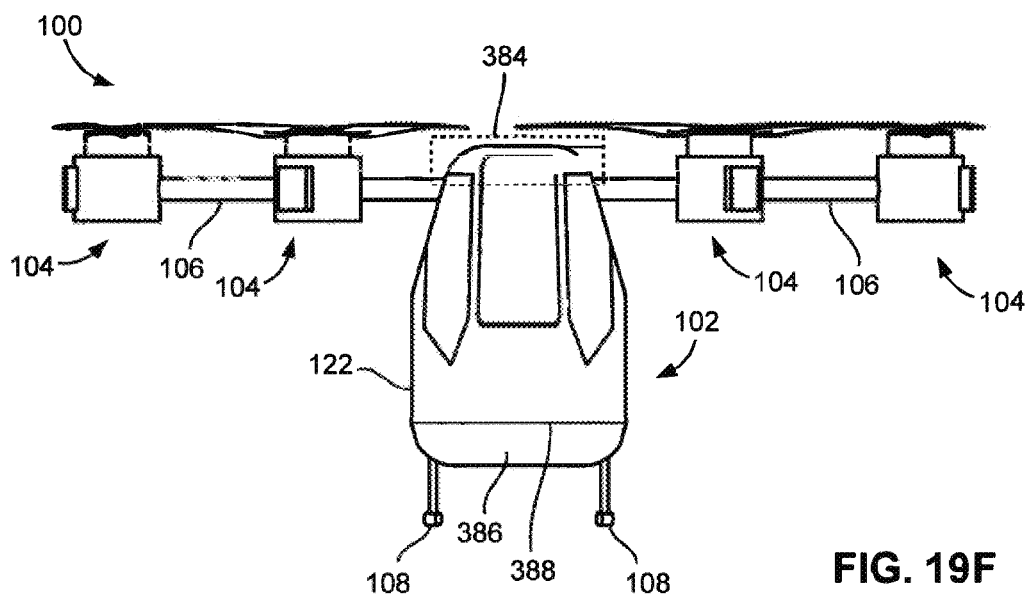
FIG. 19F is a perspective view of a battery-powered, multiple-rotor, pilotless, cargo-transportation aerial vehicle, according to some alternative embodiments of this disclosure, wherein the aerial vehicle comprises a center unit having a compartment and a plurality of supporting legs, and six rotor units coupled to an upper portion of the compartment, the compartment comprising at least some electrical components in an upper portion thereof and the battery assemblies in a lower portion thereof.

FIG. 19F shows the aerial vehicle 100 in some alternative embodiments. The aerial vehicle 100 in these embodiments is similar to that shown in FIG. 19D except that in these embodiments, the rotor units 104 are coupled to an upper portion of the compartment 122 of the center unit 102. Similar to the aerial vehicle shown in FIG. 19D, at least a portion of the sensors and electrical components sensitive to electromagnetic interference are arranged on a distal portion 384 of the compartment 122 such as a top or upper portion of the compartment 122. The compartment 122 also comprises the battery assemblies 156 on a proximal portion 386 thereof such as a lower portion of the compartment 122 under the floor 388 such that the battery assemblies 156 are at a sufficient distance to the sensors and electrical components to avoid electromagnetic interference thereto. Compared to the aerial vehicle shown in FIG. 19D, the aerial vehicle 100 in these embodiments has an advantage that the electrical components such as the central control circuitry 182 is close to the ESC module 178 and the motors 136. Thus, the central control circuitry 182 may be connected to the ESC module 178 and the motors 136 using short wirings with reduced electrical noise and/or interferences.

In above embodiments, the central control circuitry 182 is powered by the battery assemblies 156. In some alternative embodiments, the central control circuitry 182 comprises its own battery or a suitable power source, and does not require any power from the battery assemblies 156.

In above embodiments, the battery assemblies 156 are in a vertical or horizontal orientation when assembled to the aerial vehicle 100. In some alternative embodiments, some or all battery assemblies 156 may be in an inclined orientation (i.e., the angle thereof with respect to a horizontal plane, is between 0° and 90°) when assembled.

Figure 20A:
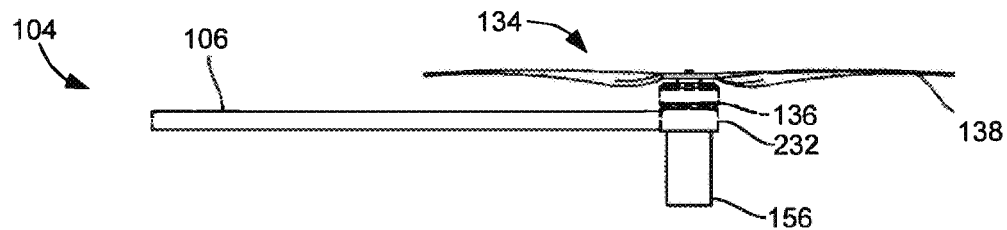
FIGS. 20A to 22E show various configurations of the battery assembly in some alternative embodiments.

FIGS. 20A to 22E show various configurations of the battery assembly 156 in some alternative embodiments. In one embodiment as shown in FIG. 20A, the rotor unit 104 is similar to that shown in FIG. 11 wherein the battery assembly 156 of a rotor unit 104 extends downwardly from the base structure 232. However, in this embodiment, the battery assembly 156 has a short length and is not configured for acting as a supporting leg. The aerial vehicle 100 in this embodiment comprises separate supporting legs (not shown).

Figure 20B:
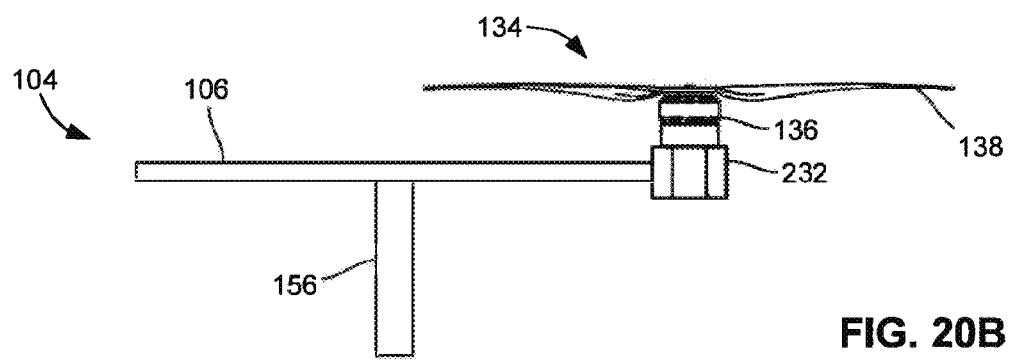

In one embodiment as shown in FIG. 20B, the battery assembly 156 of a rotor unit 104 extends downwardly from the connecting arm 106 at a location spaced from or in proximity with or adjacent the base structure 232 and the rotor assembly 134 with a sufficient distance away from the center unit (not shown). In this embodiment, the battery assembly 156 is also configured for acting as a supporting leg.

Figure 20C:
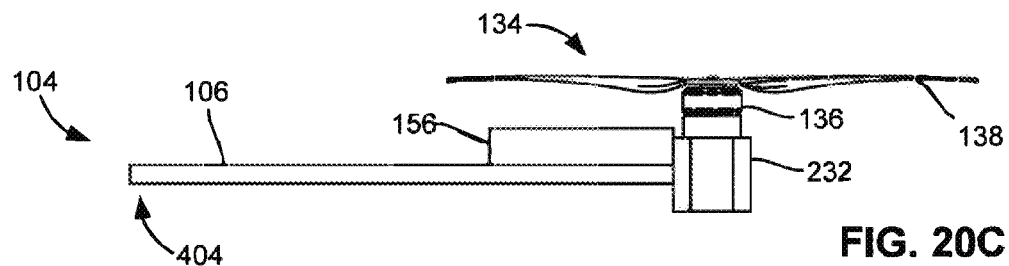

In one embodiment as shown in FIG. 20C, the battery assembly 156 of a rotor unit 104 extends horizontally backwardly from the base structure 232 towards a proximal end 404 of the rotor unit 104 and is coupled to the top of the connecting arm 106 using suitable fastening means such as screw, glue, welding, and/or the like.

Figure 20D:
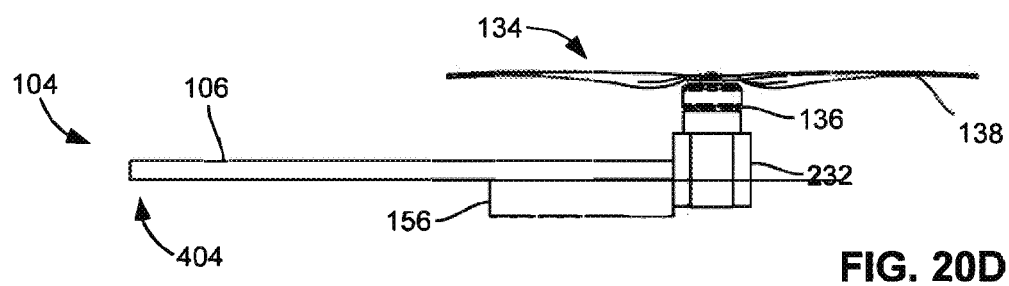

In one embodiment as shown in FIG. 20D, the battery assembly 156 of a rotor unit 104 extends horizontally backwardly from the base structure 232 towards the proximal end 404 of the rotor unit 104 and is coupled to the bottom of the connecting arm 106 using suitable fastening means such as screw, glue, welding, and/or the like.

Figure 21A:
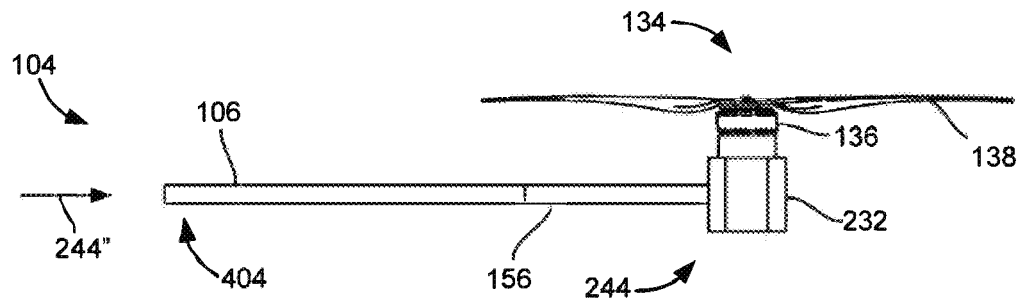
Figure 21B:
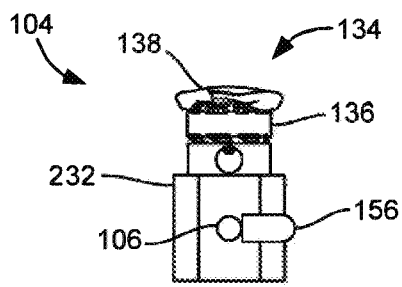
Figure 21C:
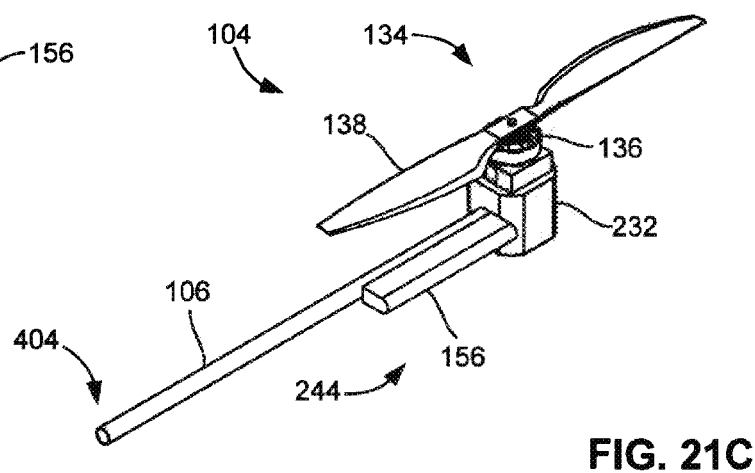

FIGS. 21A to 21C show a configuration of the battery assembly 156 in an alternative embodiment. FIG. 21A is a side view of a rotor 104. FIG. 21B is a rear view of the rotor 104 viewing from a rear side as indicated by the arrow 244". FIG. 21C is a perspective view of the rotor 104. As shown, the battery assembly 156 in this embodiment extends horizontally backwardly from the base structure 232 towards the proximal end 404 of the rotor unit 104 and is coupled to a lateral side of the connecting arm 106 using suitable fastening means such as screw, glue, welding, and/or the like.

Figure 22A:
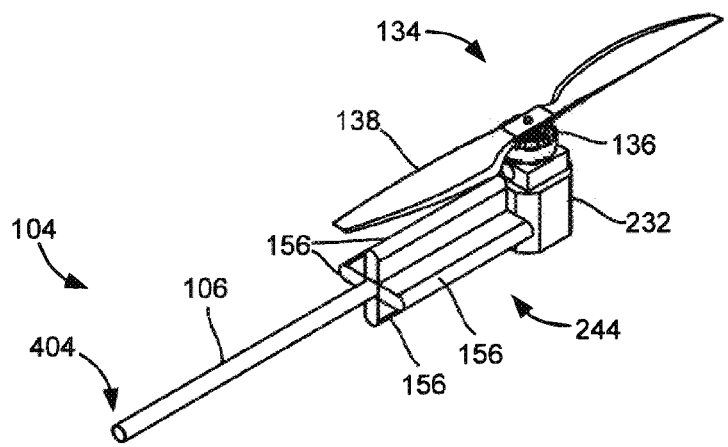

In one embodiment as shown in FIG. 22A, the battery assembly 156 of a rotor unit 104 comprises a plurality of battery units (also denoted as 156) extends horizontally backwardly from the base structure 232 towards the proximal end 404 of the rotor unit 104 and is coupled to the connecting arm 106 circumferentially thereabout using suitable fastening means such as screw, glue, welding, and/or the like.

Figure 22B:
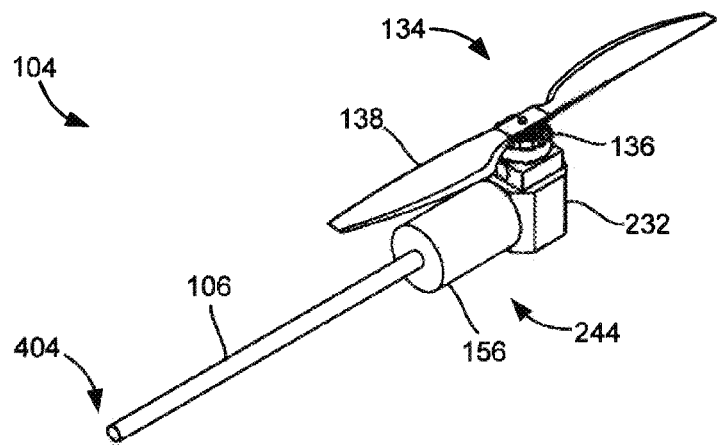

In one embodiment as shown in FIG. 22B, the battery assembly 156 comprises a longitudinal bore and extends horizontally backwardly from the base structure 232 towards the proximal end 404 of the rotor unit 104. The connecting arm 106 extends backwardly from the base structure 232 through the longitudinal bore of the battery assembly 156 and coupled to the center unit (not shown). In other words, the battery assembly 156 extends horizontally backwardly from the base structure and circumferentially about the connecting arm 106.

Figure 22C:
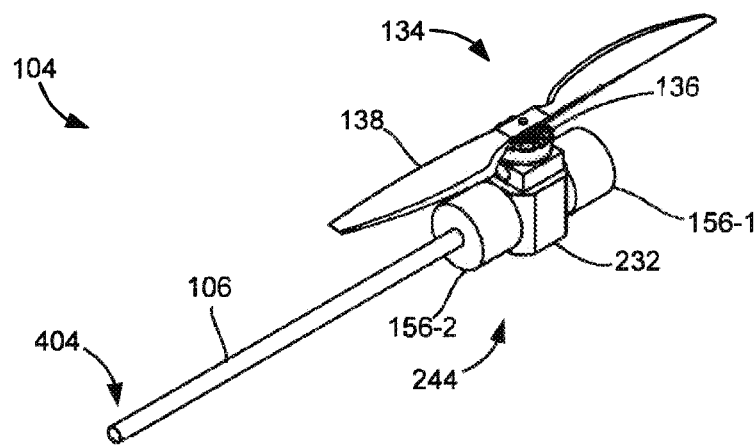

In one embodiment as shown in FIG. 22C, the battery assembly 156 comprises two battery units 156-1 and 156-2. The battery unit 156-1 extends horizontally forwardly from the base structure 232 away from the proximal end 404 of the rotor unit 104. The battery unit 156-2 comprises a longitudinal bore and extends horizontally backwardly from the base structure 232 towards the proximal end 404 of the rotor unit 104. The connecting arm 106 extends horizontally backwardly from the base structure 232 through the longitudinal bore of the battery assembly 156 and coupled to the center unit (not shown).

Figure 22D:
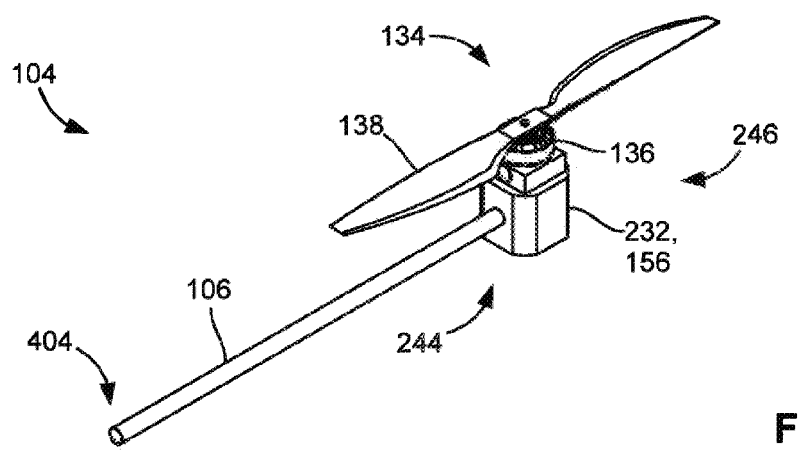

In one embodiment as shown in FIG. 22D, the battery assembly 156 may be received in or integrated with the base structure 232.

Figure 22E:
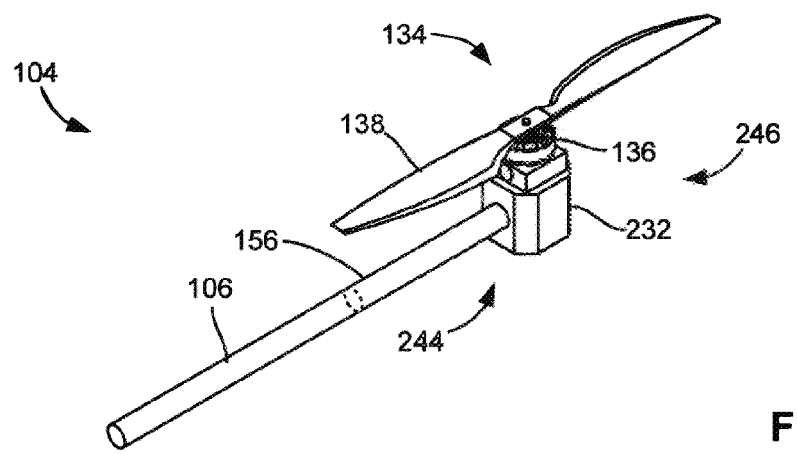

In one embodiment as shown in FIG. 22E, the battery assembly 156 may be received in or integrated with the connecting arm 106.

In above embodiments, each rotor unit 104 comprises a rotor assembly 134 configured as a puller with the blade 138 above the electrical motor 136. In some embodiments, at least some of the rotor units 104 comprises rotor assemblies 134 configured as pushers with their propellers or blades 138 below the corresponding electrical motors 110.

Figure 23A:
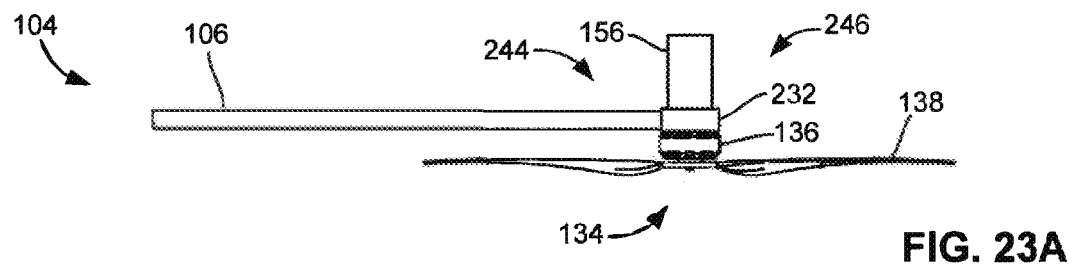
FIGS. 23A and 23B show various configurations of the battery assembly according to some alternative embodiments, wherein the rotor unit comprises a rotor assembly configured as a pusher with the blade below the electrical motor.

For example, in one embodiment as shown in FIG. 23A, the rotor assembly 134 is configured as a pusher and the battery assembly 156 extends upwardly from the base structure 232.

Figure 23B:
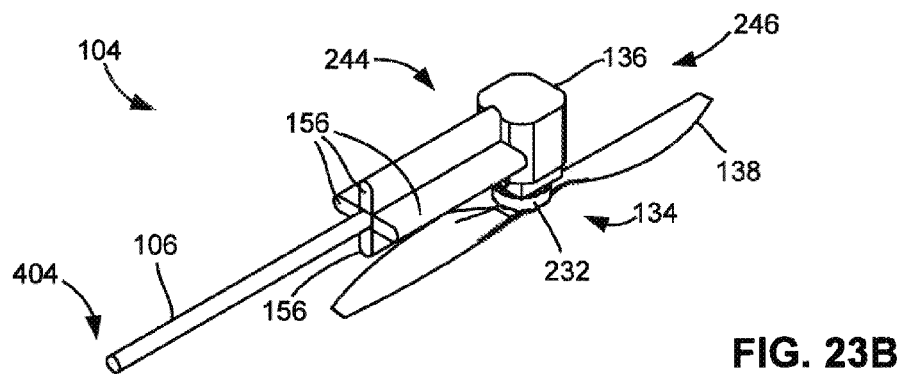

In one embodiment as shown in FIG. 23B, the rotor assembly 134 is configured as a pusher. The battery assembly 156 of a rotor unit 104 comprises a plurality of battery units extends backwardly from the base structure 232 towards the proximal end 404 of the rotor unit 104 and is coupled to the connecting arm 106 circumferentially thereabout using suitable fastening means such as screw, glue, welding, and/or the like.

Figure 24A:
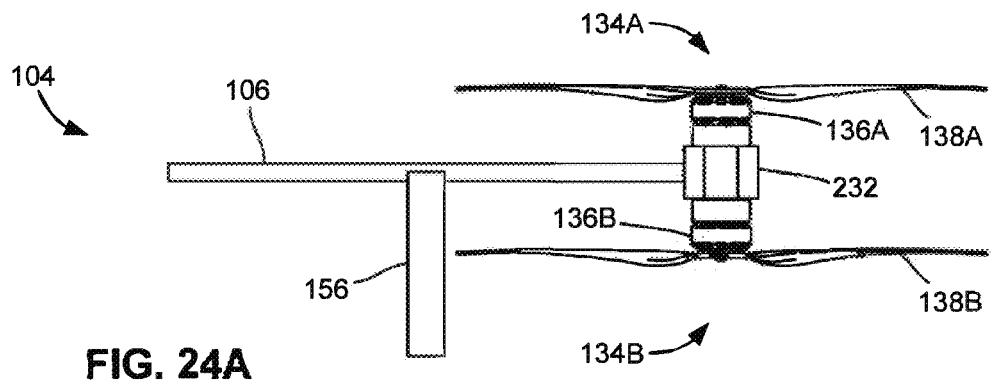
FIGS. 24A and 24B show various configurations of the battery assembly according to some alternative embodiments, wherein the rotor unit comprises two rotor assemblies with one rotor assembly configured as a puller with the blade above the electrical motor and the other rotor assembly configured as a pusher with the blade below the electrical motor.
Figure 24B:
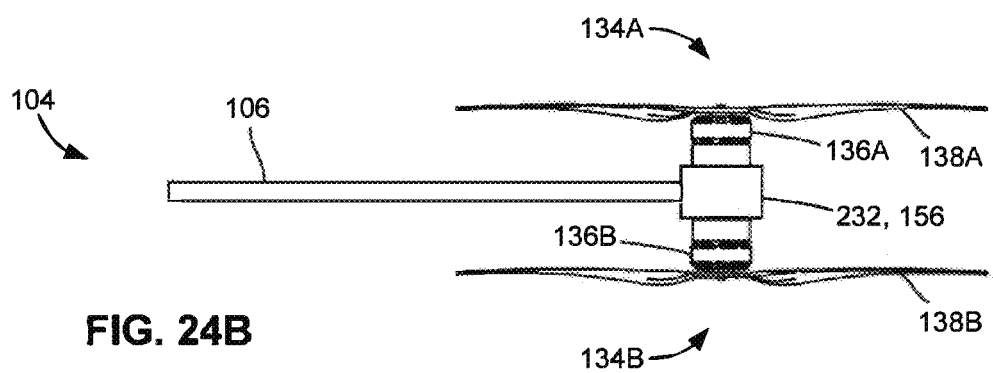

In some embodiments as shown in FIGS. 24A and 24B, one or more rotor units 104 may each comprise two rotor assemblies 134A and 134B with one rotor assembly 134A configured as a puller with the blade 138 above the electrical motor 136 and the other rotor assembly 134B configured as a pusher with the blade 138 below the electrical motor 136.

In the embodiment shown in FIG. 24A, the battery assembly 156 extends downwardly from the connecting arm 106 at a location spaced from or in proximity with or adjacent the base structure 232 and the rotor assemblies 134A and 134B with a sufficient distance away from the center unit (not shown) In this embodiment, the battery assembly 156 is also configured for acting as a supporting leg.

In the embodiment shown in FIG. 24B, the battery assembly 156 may be received in or integrated with the base structure 232.

In an embodiment similar to that shown in FIG. 24B, the battery assembly 156 may be received in or integrated with the connecting arm 106.

Although in above embodiments, the aerial vehicle 100 comprises a power-balancing board 186, in some alternative embodiments, the aerial vehicle 100 may not comprise a power-balancing board 186. The disadvantage of these embodiments is that the battery assemblies 156 may be drained in different rates. As flight of the aerial vehicle 100 is usually over when at least one battery assembly is drained out, the flight time of the aerial vehicle 100 without power balancing may be shorter than that of the aerial vehicle 100 with power balancing.

In embodiments shown in FIGS. 10 to 15, the base structure 232 comprises a first engagement structure having two pairs of grooves 252 and 254. The battery assembly 156 comprises an engageable second engagement structure having two pairs of ridges 286 and 288 engageable with the two pairs of grooves 252 and 254 the base structure 232, respectively. In some alternative embodiments, the base structure 232 may only comprise one pair of grooves, and the battery assembly 156 may only comprise one pair of ridges engageable with the pair of grooves of the base structure 232, respectively.

In some alternative embodiments, the base structure 232 may comprise three or more pairs of grooves 252 and 254, and the battery assembly 156 comprises three or more pairs of ridges 286 and 288 engageable with the three or more pairs of grooves 252 and 254 of the base structure 232, respectively.

In some alternative embodiments, the base structure 232 may comprise two pairs of ridges, and the battery assembly 156 may comprise two pairs of grooves engageable with the two pairs of ridges of the base structure 232, respectively.

In some alternative embodiments, the base structure 232 may comprise another number of pairs of ridges, and the battery assembly 156 may comprise a corresponding number of grooves engageable with the ridges of the base structure 232, respectively.

In above embodiments, each rotor unit 104 is coupled to the center unit 102 via a coupling component 106. In some alternative embodiments, at least one of the rotor units 104 may have a suitable size and shape such that the rotor unit 104 may itself be a coupling component and is directly coupled to the center unit 102.

Figure 25:
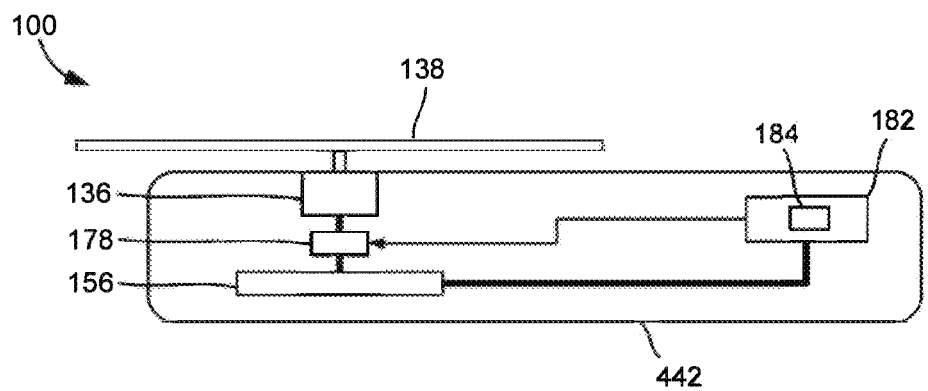
FIG. 25 is a schematic diagram of a battery-powered, pilotless, cargo-transportation aerial vehicle, according to some alternative embodiments of this disclosure, wherein the UAV comprises one motor driving one propeller.

In some alternative embodiments as shown in FIG. 25, an aerial vehicle 100 comprises a body or housing 442 housing receiving therein a plurality of components. In particular, the housing 442 receives therein a motor 136, an ESC module 178, a battery assembly 156, a c central control circuitry 182, and other suitable components as described above (not shown). Similar to the embodiments described above, the motor 136, the ESC module 178, and the battery assembly 156 are arranged in proximity with or adjacent to each other, and the central control circuitry 182 is spaced or at a distance from the battery assembly 156.

The motor 136 comprises a shaft extending out of the housing 442 and rotatably coupled to a propeller 138. The battery assembly 156 powers the motor 136 via the ESC module 178, and also powers the central control circuitry 182 and components thereof.

The central control circuitry 182 comprises a flight control module 184 which controls the ESC module 178 to adjust the speed of the motor 136 for controlling the flight of the aerial vehicle 100.

Figure 26:
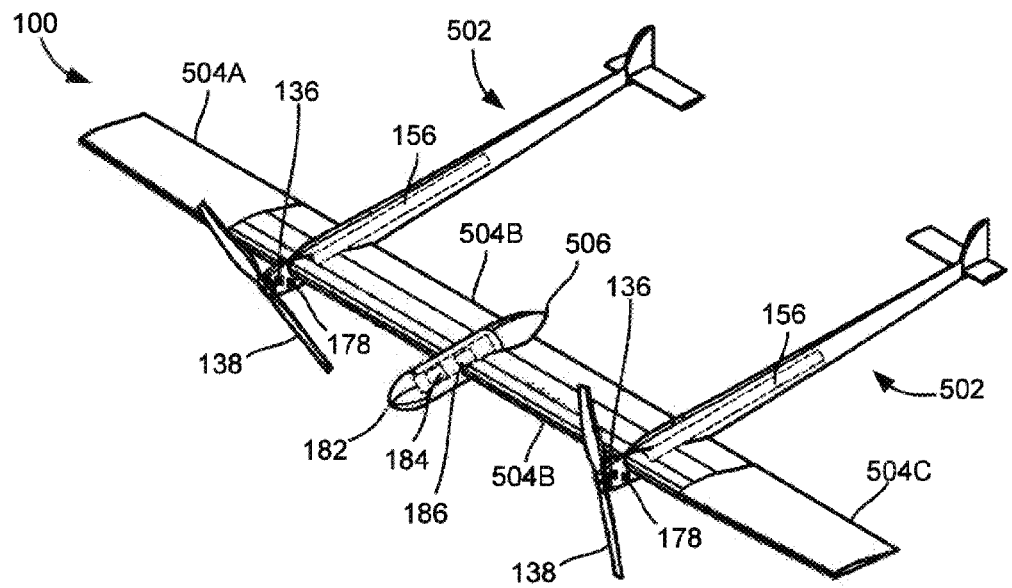
FIG. 26 is a schematic perspective view of a battery-powered, fixed-wing, twin-fuselage, pilotless, (personal or cargo) transportation aerial vehicle according to some alternative embodiments of this disclosure, wherein each fuselage comprises a battery assembly.

In some alternative embodiments as shown in FIG. 26, the battery-powered aerial vehicle 100 is a fixed-wing, twin-fuselage drone. The aerial vehicle 100 comprises a body formed by two fuselages 502 coupled by a connection section 504B in the form of a central wing section, and two side wing sections 504A and 504C extending outwardly from respective fuselages 502. The connection section 504B comprises a passenger or cargo compartment 506.

Each fuselage 502 receives therein about a front end thereof a propelling module formed by a motor 136 and an ESC 178, and a battery assembly 156 arranged in proximity with or adjacent to the propelling module. The compartment 506 receives therein a central control circuitry 182 having a flight control module 304 and a power-balancing board 186, and other suitable components as described above (not shown). Thus, the central control circuitry 182 is spaced from the battery assemblies 156.

Each motor 136 comprises a shaft extending out of the fuselage 502 and rotatably coupled to a propeller 138. The battery assemblies 156 power the motors 110 via the ESCs 178, and also power the central control circuitry 182 and components thereof. The electrical interconnection of the components of the aerial vehicle 100 in these embodiments is similar to that described in FIGS. 5 and 6.

Figure 27:
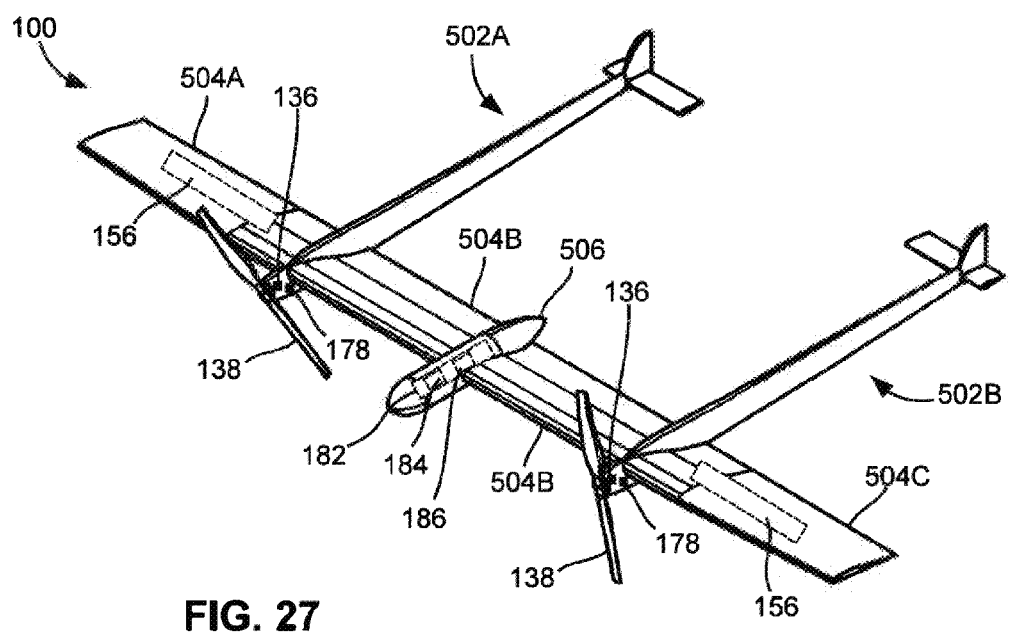
FIG. 27 is a schematic perspective view of a fixed-wing, twin-fuselage, pilotless, (personal or cargo) transportation aerial vehicle according to some alternative embodiments of this disclosure, wherein each side section of the fixed wing comprises a battery assembly.

FIG. 27 shows a fixed-wing, twin-fuselage aerial vehicle 100 in some alternative embodiments. The aerial vehicle 100 in these embodiments is similar to that shown in FIG. 26, except that in these embodiments, the fuselages 502 do not comprise any battery assembly. Rather, each side wing section 504A, 504C comprises a battery assembly 156. Thus, the central control circuitry 182 is spaced from the battery assemblies 156.

Figure 28:
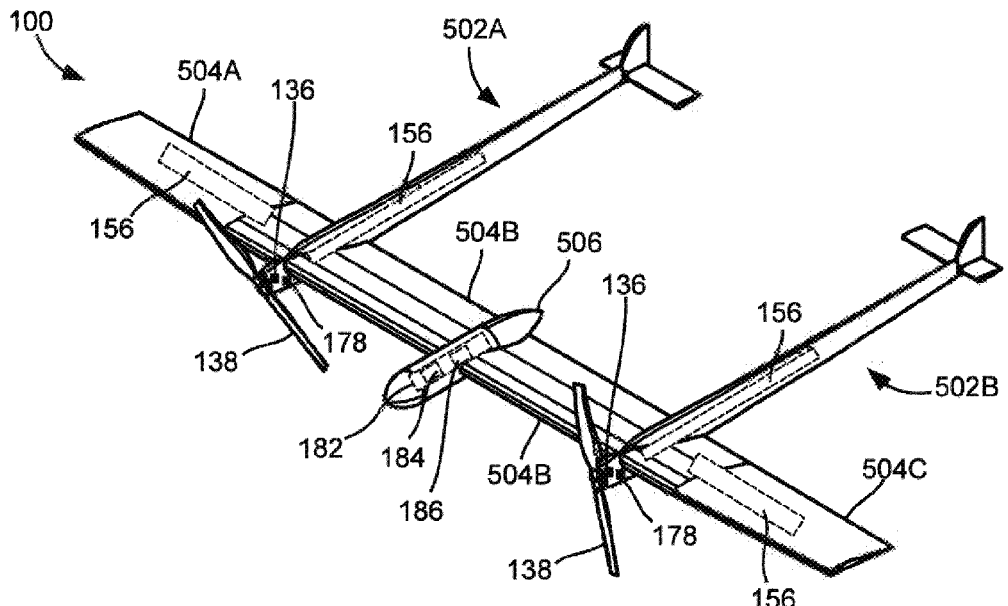
FIG. 28 is a schematic perspective view of a fixed-wing, twin-fuselage, pilotless, (personal or cargo) transportation aerial vehicle comprising four battery assemblies, according to some alternative embodiments.

FIG. 28 shows a fixed-wing, twin-fuselage aerial vehicle 100 in some alternative embodiments. The aerial vehicle 100 in these embodiments is similar to that shown in FIG. 26, except that in these embodiments, each fuselage 502 comprises a battery assembly 156, and each side wing section 504A, 504C also comprises a battery assembly 156. Thus, the central control circuitry 182 is spaced from the battery assemblies 156.

Figure 29:
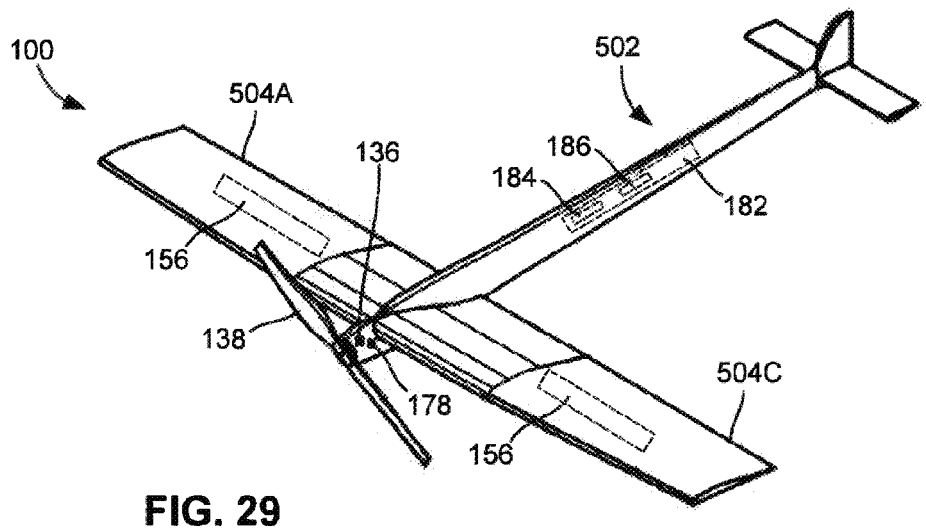
FIG. 29 is a schematic perspective view of a fixed-wing, single-fuselage, pilotless, (personal or cargo) transportation aerial vehicle comprising two battery assemblies, according to some alternative embodiments.

In some alternative embodiments as shown in FIG. 29, the battery-powered aerial vehicle 100 is a fixed-wing, single-fuselage drone. The aerial vehicle 100 comprises a body formed by a fuselage 502, and two wing sections 504A and 504C extended outwardly therefrom. The fuselage 502 receives therein about a front end thereof a propelling module formed by a motor 136 and an ESC 178. The motor 136 comprises a shaft extending forwardly out of the fuselage 502 and rotatably coupled to a propeller 138. The fuselage 502 also receives therein about a rear end thereof a central control circuitry 182 having a flight controller 304 and a power-balancing board 186, and other suitable components as described above (not shown).

Each of the wing sections 504A and 504C receives therein a battery assembly 156. Thus, the central control circuitry 182 is spaced from the battery assemblies 156.

The battery assemblies 156 power the motors 110 via the ESCs 178, and also powers the central control circuitry 182 and components thereof. The electrical interconnection of the components of the aerial vehicle 100 in these embodiments is similar to that described in FIGS. 5 and 6.

Figure 30:
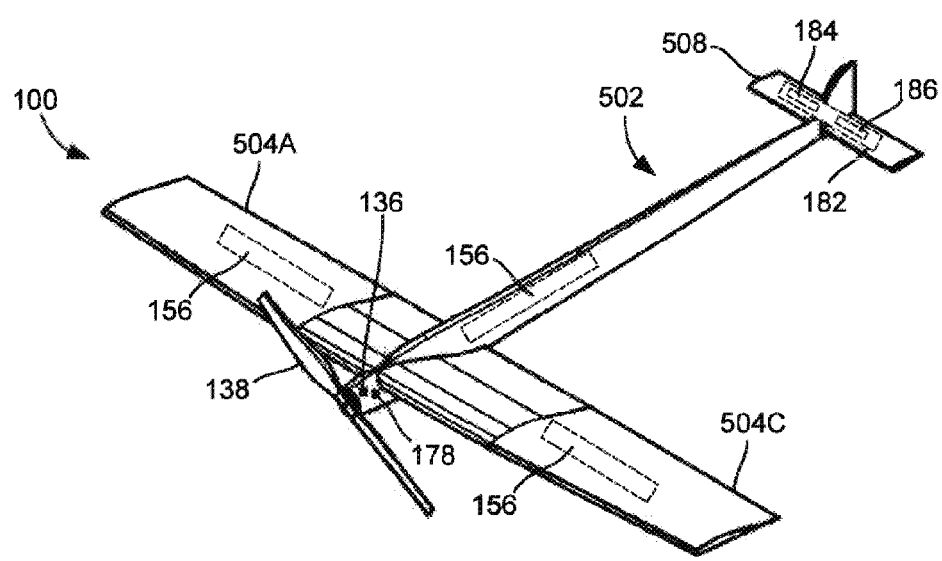
FIG. 30 is a schematic perspective view of a fixed-wing, single-fuselage, pilotless, (personal or cargo) transportation aerial vehicle comprising three battery assemblies, according to some alternative embodiments.

FIG. 30 shows a fixed-wing, single-fuselage aerial vehicle 100 in some alternative embodiments. The aerial vehicle 100 in these embodiments is similar to that shown in FIG. 29. However, in these embodiments, the central control circuitry 182 and the components thereof are located about the rear end of the fuselage 502 such as in the stabilizer 508. Moreover, the aerial vehicle 100 in these embodiments comprises three battery assemblies 156, with two battery assemblies 156 located in the left and right wing sections 504A and 504C, and the third battery assembly 156 located in the fuselage 502 about the front end thereof. Thus, the central control circuitry 182 is spaced from the battery assemblies 156.

In above embodiments, each rotor assembly 134 is functionally coupled to and controlled by an ESC module 178. In some alternative embodiments, the battery-powered aerial vehicle 100 does not comprise any individual ESC modules 178. In these embodiments, the central control circuitry 182 comprises necessary components and/or circuits implementing the functions of ESC modules 178 for controlling the speeds of the electrical motor 136.

Although in above embodiments, the aerial vehicle 100 only comprises one compartment 122 as a part of the center unit 102, in some alternative embodiments, the aerial vehicle 100 may comprise a plurality of compartments 122 distributed on the center unit 102 and/or at least some of the rotor units 104.

In above embodiments, the one or more battery assemblies 156 are at a distance away from the center unit 102. Therefore, the electromagnetic interferences to the electrical components such as magnetometer in the center unit 102 caused by the battery assemblies 156 are significantly reduced or even practically eliminated, compared to conventional design in which the battery assemblies 156 are installed in the center unit 102 and at a short distance to the electrical components therein.

As the battery assembly 156 is located in proximity with or adjacent to the electrical motor 136 and the corresponding ESC module, the electrical wiring therebetween is generally short, thereby reducing the electrical noise and variation during dynamic motor speed variations.

As those skilled in the art would appreciate, weight is an important or even a critical factor of battery-powered aerial vehicles. By locating the one or more battery assemblies at a distance away from the central control circuitry and in proximity with or adjacent to the propelling modules (and the powertrain thereof), the battery-powered aerial vehicles disclosed herein may achieve a weight reduction compared to traditional battery-powered aerial vehicles. Moreover, a generally uniform weight distribution of the battery assemblies onto the rotor units 104 provides increased stability in operation of the battery-powered aerial vehicle.

Those skilled in the art will appreciate that in above embodiments, weight reduction may be achieved in (i) weight reduction in structural parts or components of the body of the battery-powered aerial vehicle, and/or (ii) weight reduction in employing shortened lengths of power wiring.

For example, in traditional multiple-axial battery-powered aerial vehicles, the central control circuitry and battery are located in the center unit while the propelling modules are located in the rotor units. Moreover, the payload is typically located under the center unit. As the lifting forces are generated at the rotor units, consequently the structural parts of the body such as the connecting arms and the center unit (in particular the structural portion thereof that receives the connecting arms) are required to have a high strength for accommodating the combined weight of the center unit, which generally implies a high weight requirement to the connecting arms and the center unit.

On the other hand, by locating the one or more battery assemblies 156 at a distance away from the central control circuitry 182 and in proximity with or adjacent to the propelling modules 105, the one or more battery assemblies 156 are located in the rotor units 104. As the weights of the one or more battery assemblies 156 are carried by the rotor units 104, the connecting arms 106 and the center unit 102 do not require a strength as high as those of the traditional multiple-axial battery-powered aerial vehicles. The weight of the connecting arms 106 and the center unit 102 and in turn the weight of the entire battery-powered aerial vehicle 100 may be adequately reduced. Such a weight reduction gives rise to an increased battery weight/aircraft weight ratio.

The weight reduction of the battery-powered aerial vehicles 100 disclosed herein may also be achieved by using shortened lengths of power wiring.

For example, in multiple-axial battery-powered aerial vehicles, the propelling modules 105 receive power and control signals from the ESC module 178 and the ESC module 178 in turn receives power from the battery 156. Compared to the signal wires or cables only requiring small currents for transmitting control signals, power wires or cables generally require large currents and therefore are generally thicker (i.e., of larger gauges) and heavier.

In traditional multiple-axial battery-powered aerial vehicles, the central control circuitry and batteries are located in the center unit, and the propelling modules are located in the rotor units. The ESC module(s) may be located in the center unit or in rotor units. Therefore, long power cables are required between the center unit and the rotor units for delivering electrical power from the battery at the center unit to the propelling modules at a plurality of rotor units regardless where the ESC module is located.

On the other hand, in some embodiments of the battery-powered aerial vehicles 100 disclosed herein, the central control circuitry 182 is located at the center unit 102 and may have its own power source, and each rotor unit 104 comprises a battery assembly 156, ESC module 178, and propelling module 130 in proximity with or adjacent to each other, Therefore, the battery-powered aerial vehicle 100 does not require any power cables between the center unit 102 and the plurality of rotor units 104, thereby giving rise to weight reduction.

Although the battery-powered aerial vehicles 100 disclosed herein may require extended signal wires for transmitting control signals, and in some embodiments may require additional signal wires for power balancing such as active power balancing, the increased weight of signal wires may not offset the weight reduction from shortened power cables as the signal wires are generally of much lighter weight than power cables. The weight reduction from the shortened power cables may be more significant for large-size battery-powered aerial vehicles.

In some embodiments, passive power balancing is used wherein additional power cables may be used for extending from the battery assemblies 156 distributed in the rotor units 104 to a common connection point in the center unit 102. As the balancing current is generally much lower than the current required for powering the propelling modules 105 and ESC modules 178, the power cables for passive power balancing are of smaller gauges than the power cables for powering the propelling modules 105 and ESC modules 178. Moreover, each power-balancing cable may comprise a fewer number of wires than the power cable, such as two smaller-gauge wires in each power-balancing cable compared to three larger-gauge power wires in each power cable for powering propelling modules 105 and ESC modules 178. Therefore, the battery-powered aerial vehicles 100 disclosed herein may still achieve weight reduction when passive power balancing is used.

Another advantage of the battery-powered aerial vehicles 100 disclosed herein is that, by locating each battery assembly 156 in proximity with or adjacent to the corresponding ESC module 178 (e.g., see FIGS. 12 and 15), the wires between the battery assembly 156 and the ESC module 178 are shortened thereby reducing the risk of ESC failure.

Moreover, by distributing battery assemblies onto or near the rotor units 104, different types of battery assemblies may be used with increased battery safety, compared to the conventional design in which battery assemblies are installed in the center unit 102.

Although embodiments have been described above with reference to the accompanying drawings, those of skill in the art will appreciate that variations and modifications may be made without departing from the scope thereof as defined by the appended claims.

What is claimed is:

1. An electric aerial vehicle comprising:
a center unit comprising a compartment;
a plurality of rotor units coupled to the center unit via one or more connecting arms, wherein each one of the plurality of rotor units comprises at least a propeller, a motor for driving the propeller, and an electrical speed-controller (ESC) module electrically coupled to the motor;
one or more battery assemblies for providing electrical power to at least corresponding ones of the motors and corresponding ones of the ESC modules; and
a plurality of electrical circuitry components comprising a central control circuitry and at least one of a flight control subsystem, a flight management subsystem, a detecting and avoiding subsystem, or an emergency communication subsystem controlled by the central control circuitry, wherein one or more of the plurality of the electrical circuitry components are received in the center unit;

wherein the plurality of rotor units are functionally coupled to the central control circuitry; and wherein each of the one or more battery assemblies extends horizontally along the one or more connecting arms towards a proximal end of a corresponding one of the plurality of rotor units, wherein the proximal end is coupled to the center unit.

2. The electric aerial vehicle of claim 1, wherein a first one of the plurality of rotor units is configured as a puller on a front end of the center unit and a second one of the plurality of rotor units is configured as a pusher with the corresponding propeller below the respective electrical motor.

3. The electric aerial vehicle of claim 1, wherein the plurality of rotor units are coupled to an upper portion of the center unit.

4. The electric aerial vehicle of claim 1, wherein the plurality of rotor units are coupled to a lower portion of the center unit.

5. The electric aerial vehicle of claim 1, further comprising a plurality of supporting legs.

6. The electric aerial vehicle of claim 5, wherein the plurality of supporting legs comprises a plurality of floats.

7. The electric aerial vehicle of claim 1, wherein the compartment comprises a transparent canopy and a console having one or more display devices, communication devices, and input devices for one or more passengers to input commands.

8. The electric aerial vehicle of claim 1, wherein the plurality of electrical circuitry components further comprises one or more backup subsystems having at least one of double-redundancy or triple-redundancy for at least the flight control subsystem, the flight management subsystem, the detecting and avoiding subsystem, and the emergency communication subsystem.

9. The electric aerial vehicle of claim 1, wherein the plurality of electrical circuitry components further comprises a backup central control circuitry having at least one of double-redundancy or triple-redundancy.

10. The electric aerial vehicle of claim 1, wherein the detecting and avoiding subsystem is configured to maintain real-time communication with at least one of an onboard autopilot or a ground control station.

11. The electric aerial vehicle of claim 1, wherein the plurality of rotor units is coupled to the center unit via the one or more connecting arms in at least one of quadcopter, hexacopter, octocopter, fixed-wing single-fuselage, or fixed-wing twin-fuselage configurations.

12. The electric aerial vehicle of claim 1, further comprising a hybrid powertrain having a fossil-fuel-powered engine.

13. The electric aerial vehicle of claim 5, wherein at least one of the plurality of supporting legs extends downwardly from one of the plurality of rotor units.

14. The electric aerial vehicle of claim 1, wherein at least one of the one or more battery assemblies is received in or integrated with the one or more connecting arms.

15. The electric aerial vehicle of claim 1, wherein the plurality of electrical circuitry components further comprises a backup central control circuitry.

16. The electric aerial vehicle of claim 1, wherein the plurality of electrical circuitry components further comprises one or more sensors comprising at least one of a microphone, a visual camera, a video camera, an infrared camera, a Light Detection and Ranging (LIDAR) sensor, a Radio Frequency (RF) transceiver, a Global Positioning System (GPS) receiver, an inertial measurement unit (IMU) having an accelerometer and a gyroscope, a barometer, a magnetometer, a temperature sensor, or a radar detector, the one or more sensors distributed throughout the center unit and the plurality of rotor units.

17. The electric aerial vehicle of claim 1, wherein at least one of the one or more battery assemblies comprises at least one of metal-clad batteries, Lithium-ion batteries, or Lithium-ion polymer batteries.

18. The electric aerial vehicle of claim 1, wherein the flight control subsystem and flight management subsystem are configured for automatically controlling the flight of the electric aerial vehicle.

19. The electric aerial vehicle of claim 1, wherein the plurality of electrical circuitry components further comprises a communication subsystem and a power management subsystem.

20. The electric aerial vehicle of claim 1, wherein the plurality of electrical circuitry components further comprises a climate control subsystem, a furniture control subsystem, an entertainment subsystem, and a booking and payment subsystem.

* * * * *

UNITED STATES PATENT AND TRADEMARK OFFICE
CERTIFICATE OF CORRECTION

PATENT NO. : 12,312,081 B2  
APPLICATION NO. : 18/375676  
DATED : May 27, 2025  
INVENTOR(S) : Hanna et al.

Page 1 of 2

It is certified that error appears in the above-identified patent and that said Letters Patent is hereby corrected as shown below:

In the Specification

In Column 1, Line 10, delete "2021," and insert -- 2021, now U.S. Pat. No. 11,772,794, --, therefor.

In Column 1, Line 42, delete "(Li—Po)" and insert -- (Li-Po) --, therefor.

In Column 1, Line 43, delete "Li—Po" and insert -- Li-Po --, therefor.

In Column 2, Line 59, delete "Li—Po" and insert -- Li-Po --, therefor.

In Column 6, Line 20, delete "altemative" and insert -- alternative --, therefor.

In Column 6, Line 25, delete "altemative" and insert -- alternative --, therefor.

In Column 6, Line 63, delete "altemative" and insert -- alternative --, therefor.

In Column 7, Line 6, delete "altemative" and insert -- alternative --, therefor.

In Column 7, Line 12, delete "altemative" and insert -- alternative --, therefor.

In Column 7, Line 18, delete "altemative" and insert -- alternative --, therefor.

In Column 7, Line 32, delete "altemative" and insert -- alternative --, therefor.

In Column 7, Line 41, delete "altemative" and insert -- alternative --, therefor.

In Column 7, Line 50, delete "altemative" and insert -- alternative --, therefor.

In Column 7, Line 60, delete "altemative" and insert -- alternative --, therefor.

Signed and Sealed this  
Fifth Day of August, 2025

Coke Morgan Stewart  
*Acting Director of the United States Patent and Trademark Office*

In Column 7, Line 65, delete "altemative" and insert -- alternative --, therefor.

In Column 8, Line 6, delete "altemative" and insert -- alternative --, therefor.

In Column 10, Line 14, delete "(Li—Po)" and insert -- (Li-Po) --, therefor.

In Column 11, Line 15, delete "shown)" and insert -- shown). --, therefor.

In Column 11, Line 44, delete "fumiture" and insert -- furniture --, therefor.

In Column 14, Line 39, delete "(Li—Po)" and insert -- (Li-Po) --, therefor.

In Column 16, Line 24, delete "from of" and insert -- from --, therefor.

In Column 17, Line 18, delete "intermediate a" and insert -- intermediate to a --, therefor.

In Column 17, Line 19, delete "assembly" and insert -- assembly. --, therefor.

In Column 20, Line 26, delete "shown)" and insert -- shown). --, therefor.

In Column 24, Line 1, delete "other," and insert -- other. --, therefor.